United States Patent
Tokioka et al.

(10) Patent No.: US 10,569,802 B2
(45) Date of Patent: Feb. 25, 2020

(54) VEHICLE STEERING SYSTEM

(71) Applicant: JTEKT CORPORATION, Osaka-shi, Osaka (JP)

(72) Inventors: Ryoichi Tokioka, Kashiba (JP); Yuzo Nonoguchi, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 133 days.

(21) Appl. No.: 15/716,849

(22) Filed: Sep. 27, 2017

(65) Prior Publication Data

US 2018/0093707 A1 Apr. 5, 2018

(30) Foreign Application Priority Data

Oct. 5, 2016 (JP) .................................. 2016-197114

(51) Int. Cl.
*B62D 9/00* (2006.01)
*B62D 7/00* (2006.01)
(Continued)

(52) U.S. Cl.
CPC ............. *B62D 9/00* (2013.01); *B60G 15/067* (2013.01); *B62D 5/0418* (2013.01); *B62D 7/00* (2013.01); *F16D 3/16* (2013.01); *B60G 3/02* (2013.01); *B60G 15/02* (2013.01); *B60G 2200/44* (2013.01); *B60G 2202/31* (2013.01);
(Continued)

(58) Field of Classification Search
CPC ................................ B62D 5/0418; B62D 9/00
See application file for complete search history.

(56) References Cited

U.S. PATENT DOCUMENTS 4,877,098 A * 10/1989 Asanuma .................. B60G 3/01
  180/402
6,206,132 B1 * 3/2001 Urbach .................. B62D 5/0418
  180/402
(Continued)

FOREIGN PATENT DOCUMENTS

DE           30 16 063 A1    12/1981
DE    10 2012 022 386 A1     5/2014
(Continued)

OTHER PUBLICATIONS

Mar. 8, 2018 Extended European Search Report issued in Patent Application No. 17194472.1.

*Primary Examiner* — Joseph M Rocca
*Assistant Examiner* — Harold Eric Pahlck, III
(74) *Attorney, Agent, or Firm* — Oliff PLC

(57) ABSTRACT

A vehicle steering system includes a steering operation mechanism configured to steer a steered wheel, and a steering operation motor configured to apply a drive force for steering the steered wheel to the steering operation mechanism. The steering operation mechanism includes an input shaft to which the drive force from the steering operation motor is input, an output shaft configured to output the drive force from the input shaft to the steered wheel, and a coupling mechanism configured to couple the input shaft and the output shaft to each other. The coupling mechanism includes a first universal joint and a second universal joint that transmit the drive force from the input shaft to the output shaft in a state in which the output shaft is angularly offset from the input shaft. The output shaft constitutes a part of a suspension.

11 Claims, 10 Drawing Sheets

(51) Int. Cl.
*F16D 3/16* (2006.01)
*B62D 5/04* (2006.01)
*B60G 15/06* (2006.01)
*B60G 3/02* (2006.01)
*B60G 15/02* (2006.01)

(52) U.S. Cl.
CPC .... *B60G 2202/42* (2013.01); *B60G 2204/128* (2013.01); *B62D 5/0421* (2013.01)

(56) References Cited

U.S. PATENT DOCUMENTS

| | | | |
|---|---|---|---|
| 7,866,434 B2* | 1/2011 | Shiino | B60G 7/006 |
| | | | 180/411 |
| 2003/0111289 A1* | 6/2003 | Brill | B62D 5/0418 |
| | | | 180/431 |
| 2007/0045036 A1* | 3/2007 | Takeuchi | B60G 17/005 |
| | | | 180/411 |

FOREIGN PATENT DOCUMENTS

| | | |
|---|---|---|
| EP | 1 860 016 A2 | 11/2007 |
| EP | 2 610 133 A1 | 7/2013 |
| JP | 2007-055409 A | 3/2007 |
| JP | 2007-099054 A | 4/2007 |
| JP | 2015-131618 A | 7/2015 |
| WO | 03/106245 A1 | 12/2003 |

* cited by examiner

VEHICLE STEERING SYSTEM

INCORPORATION BY REFERENCE

The disclosure of Japanese Patent Application No. 2016-197114 filed on Oct. 5, 2016 including the specification, drawings and abstract, is incorporated herein by reference in its entirety.

BACKGROUND OF THE INVENTION

1. Field of the Invention

The present invention relates to a vehicle steering system.

2. Description of the Related Art

In a vehicle steering system of Japanese Patent Application Publication No. 2007-99054 (JP 2007-99054 A), a strut serving as a suspension component is supported by a bearing so as to be rotatable about a central axis of the strut. Rotation of a steering wheel is transmitted to the strut via a worm wheel of a gear box. Thus, the strut is turned about a kingpin axis intersecting the central axis of the strut, thereby steering a steered wheel.

When the steered wheel is steered, the strut pivots about a pivot center defined at a portion supported by the bearing. The angle between the kingpin axis and the central axis of the strut may slightly change due to assembling tolerances of the parts of the vehicle steering system or loads input from the steered wheel. Thus, the portion of the strut that is supported by the bearing and the pivot center may deviate from each other. When the strut pivots about the kingpin axis in a state in which the portion of the strut that is supported by the bearing and the pivot center deviate from each other, rubber interposed between the bearing and a vehicle body expands and contracts or pivots about the kingpin axis. As a result, the strut is subjected to a load such that the strut and the worm wheel deviate from their proper relative positions.

In the vehicle steering system described in JP 2007-99054 A, the strut and the worm wheel are coupled to each other by splines. Therefore, the central axis of the worm wheel and the central axis of the strut cannot be offset from each other. Thus, when the strut is subjected to a load in a direction intersecting the direction in which the central axis of the worm wheel extends, a stress concentrates on the strut, and therefore the strut is deformed. Thus, a problem arises in that power cannot accurately be transmitted to the steered wheel.

As a measure to offset the central axis of the worm wheel and the central axis of the strut from each other, it is proposed that rubber be interposed between the worm wheel and the strut. In this case, however, there is a time difference between rotation of the worm wheel and rotation of the strut. Therefore, it is likely that the rotation of the steering wheel cannot accurately be transmitted to the steered wheel.

SUMMARY OF THE INVENTION

It is one object of the present invention to provide a vehicle steering system capable of steering a steered wheel accurately.

A vehicle steering system according to one aspect of the present invention has the following features in its structure. That is, the vehicle steering system includes a steering operation mechanism configured to steer a steered wheel, and an actuator configured to apply a drive force for steering the steered wheel to the steering operation mechanism. The steering operation mechanism includes an input shaft to which the drive force from the actuator is input, an output shaft configured to output the drive force from the input shaft to the steered wheel, and a coupling mechanism configured to couple the input shaft and the output shaft to each other. The coupling mechanism includes a universal joint that transmits the drive force from the input shaft to the output shaft in a state in which the output shaft is angularly offset from the input shaft. The output shaft constitutes a part of a suspension.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
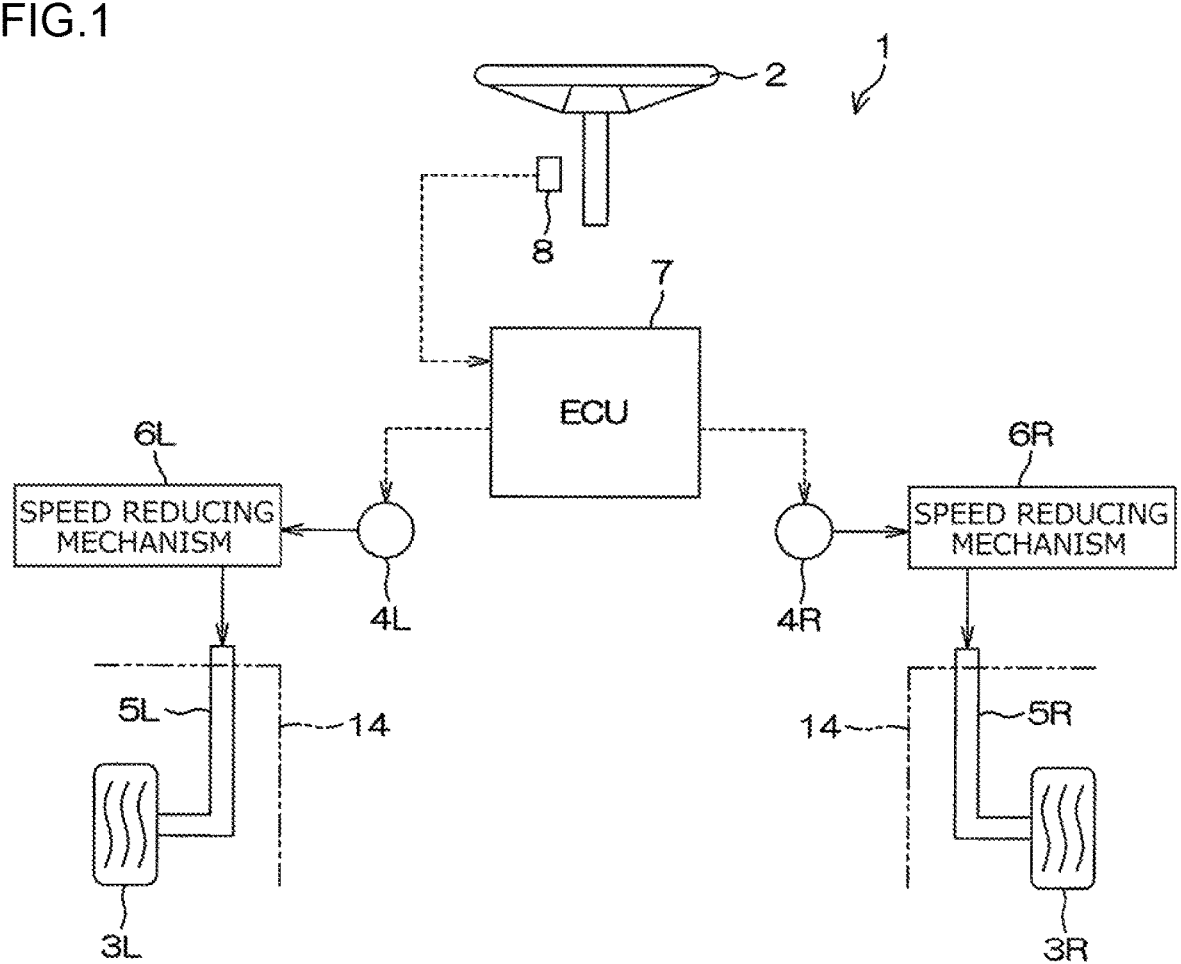
FIG. 1 is a schematic view for describing the structure of a vehicle steering system according to a first embodiment of the present invention.

Embodiments of the present invention are described below in detail with reference to the accompanying drawings. FIG. 1 is a schematic view for describing the structure of a vehicle steering system 1 according to a first embodiment of the present invention. The vehicle steering system 1 has a structure of a steer-by-wire system that employs a laterally independent steering operation system. The vehicle steering system 1 includes a steering wheel 2 serving as a steering member to be operated by a driver for steering, and a right steered wheel 3R and a left steered wheel 3L arranged on a front side of a vehicle.

The vehicle steering system 1 further includes a right steering operation mechanism 5R, a right steering operation motor 4R, and a right speed reducing mechanism 6R. The right steering operation mechanism 5R steers the right steered wheel 3R. The right steering operation motor 4R generates a drive force (rotational drive force) for steering the right steered wheel 3R in response to a rotational operation for the steering wheel 2. The right speed reducing mechanism 6R reduces the speed of rotation transmitted from the right steering operation motor 4R. The right steering operation motor 4R is an electric motor, which is an example of a right actuator configured to apply a drive force for steering the right steered wheel 3R to the right steering operation mechanism 5R.

The vehicle steering system 1 further includes a left steering operation mechanism 5L, a left steering operation motor 4L, and a left speed reducing mechanism 6L. The left steering operation mechanism 5L steers the left steered wheel 3L. The left steering operation motor 4L generates a drive force (rotational drive force) for steering the left steered wheel 3L in response to a rotational operation for the steering wheel 2. The left speed reducing mechanism 6L reduces the speed of rotation transmitted from the left steering operation motor 4L. The left steering operation motor 4L is an electric motor, which is an example of a left actuator configured to apply a drive force for steering the left steered wheel 3L to the left steering operation mechanism 5L.

There is no mechanical coupling between the steering wheel 2 and the right steering operation mechanism 5R and between the steering wheel 2 and the left steering operation mechanism 5L such that steering torque applied to the steering wheel 2 is mechanically transmitted to the right steering operation mechanism 5R and the left steering operation mechanism 5L. The right steered wheel 3R is steered only by the drive force from the right steering operation motor 4R. The left steered wheel 3L is steered only by the drive force from the left steering operation motor 4L.

The right steering operation motor 4R and the left steering operation motor 4L are connected to an electronic control unit (ECU) 7. The right steering operation motor 4R and the left steering operation motor 4L are driven under control from the ECU 7. The ECU 7 receives, for example, signals input from a steering angle sensor 8 configured to detect a steering angle of the steering wheel 2. Based on the input signals, the ECU 7 controls the drive of the right steering operation motor 4R and the drive of the left steering operation motor 4L.

Figure 2:
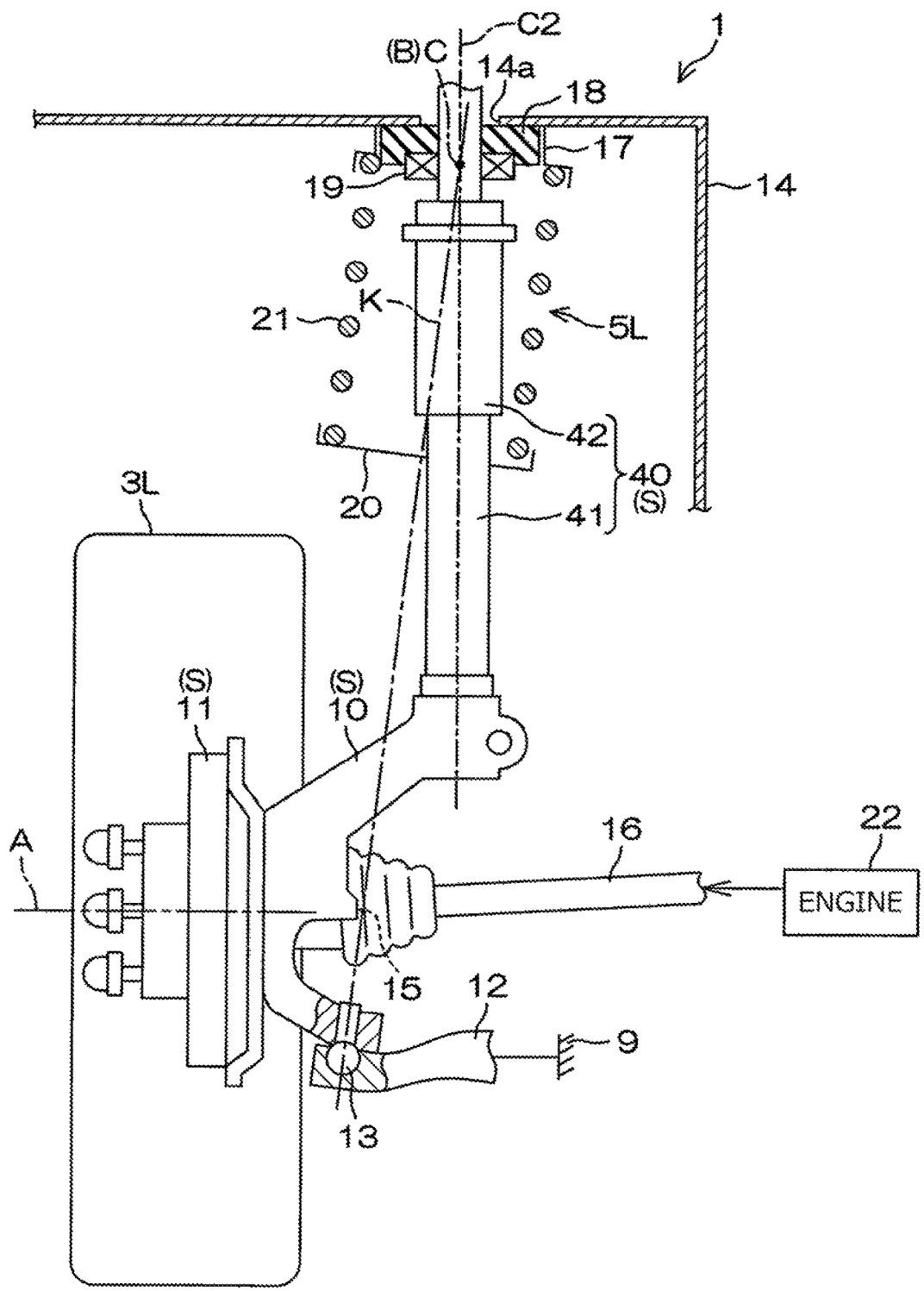
FIG. 2 is a sectional view schematically illustrating the periphery of a steered wheel according to the first embodiment.
Figure 3:
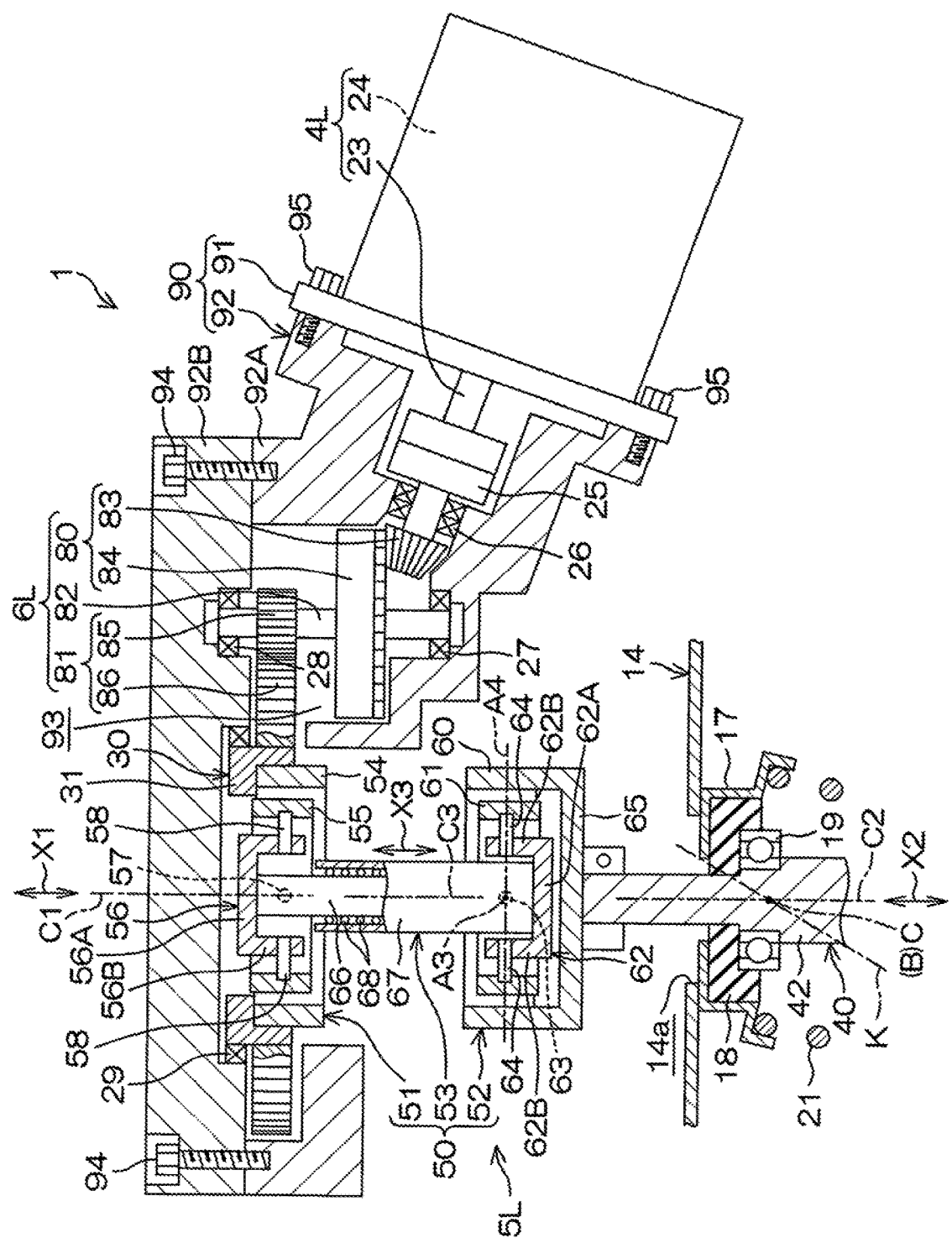
FIG. 3 is a sectional view schematically illustrating the periphery of a steering operation motor according to the first embodiment.

FIG. 2 is a sectional view schematically illustrating the periphery of the left steered wheel 3L. FIG. 3 is a sectional view schematically illustrating the periphery of the left steering operation motor 4L. The left steering operation motor 4L, the left steering operation mechanism 5L, and the left speed reducing mechanism 6L are described below in detail. The right steering operation motor 4R, the right steering operation mechanism 5R, and the right speed reducing mechanism 6R have structures similar to those of the left steering operation motor 4L, the left steering operation mechanism 5L, and the left speed reducing mechanism 6L, respectively. Therefore, description is omitted for the structures of the right steering operation motor 4R, the right steering operation mechanism 5R, and the right speed reducing mechanism 6R.

Referring to FIG. 3, the left steering operation mechanism 5L includes an input shaft 30, an output shaft 40, and a coupling mechanism 50. The drive force from the left steering operation motor 4L is input to the input shaft 30. The output shaft 40 outputs the drive force from the input shaft 30 to the left steered wheel 3L. The coupling mechanism 50 couples the input shaft 30 and the output shaft 40 to each other. The input shaft 30 is a cylindrical shaft and extends in a vertical direction. The input shaft 30 has a central axis C1 that extends in a substantially vertical direction. The direction in which the central axis C1 extends is referred to as an axial direction X1 of the input shaft 30. The output shaft 40 is arranged below the input shaft 30. The output shaft 40 has a central axis C2 that extends in a substantially vertical direction. The direction in which the central axis C2 extends is referred to as an axial direction X2 of the output shaft 40.

Referring to FIG. 2, the output shaft 40 is a telescopic shaft that is extensible and contractible in the axial direction X2 of the output shaft 40. The output shaft 40 includes a first shaft 41 and a second shaft 42 that are coupled to each other by spline fitting or the like so as to be rotatable together (capable of transmitting power) and movable relative to each other in the axial direction X2 of the output shaft 40. The first shaft 41 is inserted into (fitted into) the second shaft 42 from its lower side. In this embodiment, the first shaft 41 is inserted into the second shaft 42. Unlike this embodiment, the second shaft 42 may be inserted into the first shaft 41.

The left steering operation mechanism 5L further includes a hub carrier 10, a hub 11, a lower arm 12, and a guide joint 13. The hub carrier 10 is coupled to the lower end of the first shaft 41 of the output shaft 40. The hub 11 is coupled to the hub carrier 10, and is fixed to the left steered wheel 3L. The lower arm 12 is coupled to the hub carrier 10. The guide joint 13 couples the lower arm 12 and the hub carrier 10 to each other, and has a kingpin axis K that is a central axis when the left steered wheel 3L is turned. The hub carrier 10 is also referred to as a knuckle. The hub carrier 10 supports the left steered wheel 3L via the hub 11. The lower end (one end) of the output shaft 40 is coupled to the hub carrier 10, and the upper end (other end) of the output shaft 40 is coupled to the coupling mechanism 50 (see FIG. 3 as well). The hub carrier 10, the hub 11, and the output shaft 40 constitute a suspension S (suspension mechanism). The output shaft 40 is a suspension component that constitutes a part of the suspension S. That is, the output shaft 40 that constitutes a part of the suspension S is used as the left steering operation mechanism 5L. In this embodiment, the output shaft 40 is a strut damper to be used for the MacPherson-type suspension S.

One end of a drive shaft 16 is coupled to the hub 11 via a constant velocity joint 15. A rotational drive force from an engine 22 is transmitted to the other end of the drive shaft 16. The rotational drive force from the engine 22 is transmitted from the drive shaft 16 to the left steered wheel 3L via the hub 11, thereby rotating the left steered wheel 3L about a rotation axis A that extends in a horizontal direction. A bearing (not illustrated) is interposed between the hub 11 and the hub carrier 10. The bearing allows the hub 11 and the hub carrier 10 to rotate relative to each other about the rotation axis A of the left steered wheel 3L. The lower arm 12 coupled to the hub carrier 10 is supported by a vehicle body 9. This structure prevents rotation of the hub carrier 10 about the rotation axis A due to the rotational drive force from the engine 22.

The vehicle steering system 1 further includes a cover 14 that is fixed to the vehicle body and covers the left steered wheel 3L at least from its upper side. The cover 14 may be a part of the vehicle body. In the vicinity of the left steered wheel 3L, the cover 14 partitions an engine compartment or a vehicle cabin from the outside of the vehicle body. The left steered wheel 3L is separately located outside the engine compartment or the vehicle cabin. The left steering operation motor 4L and the left speed reducing mechanism 6L are arranged in the vehicle cabin or the engine compartment. That is, the cover 14 is a partition wall provided between the left steered wheel 3L and the left steering operation motor 4L and between the left steered wheel 3L and the left speed reducing mechanism 6L (see FIG. 3 as well).

The second shaft 42 is inserted through a through hole 14a passing through the cover 14 in the vertical direction. The upper end of the second shaft 42 protrudes upward from the cover 14. A fixing member 17 is fixed to the cover 14. The fixing member 17 surrounds the periphery of a portion of the second shaft 42 that is inserted through the through hole 14a, and extends downward. The left steering operation mechanism 5L includes a strut mount 18 and a deep groove ball bearing 19. The strut mount 18 is attached to the fixing member 17, and surrounds the periphery of the portion of the second shaft 42 that is inserted through the through hole 14a. The deep groove ball bearing 19 is attached to the strut mount 18, and supports the second shaft 42 so that the second shaft 42 is rotatable about the central axis C2 of the output shaft 40. For example, an angular contact ball bearing may be used in place of the deep groove ball bearing 19.

The strut mount 18 is formed of an elastic body such as rubber. The first shaft 41 is provided with a facing member 20 that faces the fixing member 17 from its lower side. A spring 21 is arranged between the facing member 20 and the fixing member 17. The spring 21 extends and contracts along a direction in which the kingpin axis K extends. Abutment between a second universal joint 52 (described later) of the coupling mechanism 50 and the cover 14 prevents the strut mount 18 from falling off downward. A cushioning member (not illustrated) may be interposed between the second universal joint 52 and the cover 14.

The drive force from the left steering operation motor 4L is transmitted to the left steered wheel 3L via the input shaft 30, the coupling mechanism 50, the output shaft 40, the hub carrier 10, and the hub 11 (see FIG. 3 as well). Thus, the left steered wheel 3L is steered by being turned about the kingpin axis K. When the left steered wheel 3L is steered, the output shaft 40 pivots about a pivot center C defined at an intersection of the kingpin axis K and the central axis C2. When the left steered wheel 3L is steered, the pivot center C preferably coincides with an angular offset center B at a portion of the output shaft 40 that is supported by the deep groove ball bearing 19.

Referring to FIG. 3, at least a part of the left steering operation motor 4L is arranged side by side with the coupling mechanism 50 in a direction (substantially horizontal direction) orthogonal to the axial direction X1 of the input shaft 30. The left steering operation motor 4L includes a rotation shaft 23 and a drive source 24 configured to drive the rotation shaft 23 to rotate. The drive source 24 includes a rotor and a stator (not illustrated). The left speed reducing mechanism 6L includes a first speed reducer 80, a second speed reducer 81, and an intermediate shaft 82. The first speed reducer 80 reduces the speed of rotation of the rotation shaft 23. The second speed reducer 81 further reduces the speed of rotation that is reduced by the first speed reducer 80, and transmits the rotation to the input shaft 30. The intermediate shaft 82 couples the first speed reducer 80 and the second speed reducer 81 to each other.

The vehicle steering system 1 further includes a housing 90 that houses the left steering operation motor 4L and the left speed reducing mechanism 6L. The housing 90 includes a motor housing 91 that houses the drive source 24 of the left steering operation motor 4L, and a gear housing 92 that houses the rotation shaft 23 and the left speed reducing mechanism 6L. The gear housing 92 is fixed to the cover 14 with, for example, a plurality of screws. The gear housing 92 includes a first portion 92A that abuts against the motor housing 91 in the substantially horizontal direction, and a second portion 92B that abuts against the first portion 92A from its upper side. The first portion 92A and the second portion 92B define a housing space 93 where the rotation shaft 23 and the left speed reducing mechanism 6L are arranged. The housing space 93 communicates with an internal space of the motor housing 91. The first portion 92A and the second portion 92B of the gear housing 92 are fixed to each other with a plurality of screws 94. The first portion 92A of the gear housing 92 and the motor housing 91 are fixed to each other with a plurality of screws 95.

A coupling 25 may be provided at a substantially central portion of the rotation shaft 23 in its axial direction. The rotation shaft 23 is supported by the gear housing 92 so as to be rotatable about a central axis of the rotation shaft 23 via a bearing 26 provided between the first portion 92A of the gear housing 92 and the rotation shaft 23. The lower end of the intermediate shaft 82 is supported by the first portion 92A of the gear housing 92 via a bearing 27. The upper end of the intermediate shaft 82 is supported by the second portion 92B of the gear housing 92 via a bearing 28. Thus, the intermediate shaft 82 is supported by the gear housing 92 so as to be rotatable about a central axis of the intermediate shaft 82. The input shaft 30 is supported by the gear housing 92 so as to be rotatable about the central axis C1 of the input shaft 30 via a bearing 29 provided between the upper end of the input shaft 30 and the second portion 92B of the gear housing 92.

The first speed reducer 80 includes a first gear 83 and a second gear 84. The first gear 83 is provided at the distal end of the rotation shaft 23. The second gear 84 meshes with the first gear 83, and is provided on the intermediate shaft 82. The second speed reducer 81 includes a third gear 85 and a fourth gear 86. The third gear 85 is provided above the second gear 84 on the intermediate shaft 82. The fourth gear 86 meshes with the third gear 85, and is provided so as to be rotatable together with the input shaft 30. The first gear 83 is, for example, an angular bevel gear. The second gear 84 is, for example, an angular zerol bevel gear. Therefore, the rotation shaft 23 extends in a direction intersecting the axial direction of the intermediate shaft 82. The third gear 85 and the fourth gear 86 are, for example, spur gears. Therefore, the intermediate shaft 82 extends parallel to the axial direction of the input shaft 30. Thus, the rotation shaft 23 extends in a direction intersecting the axial direction X1 of the input shaft 30. The third gear 85 and the fourth gear 86 may be helical gears.

When the second gear 84 is an angular bevel gear, the rotation shaft 23 extends in a direction intersecting the axial direction X1 so as to be located at a lower level with increasing distance from the input shaft 30. Unlike this embodiment, the second gear 84 may be an orthogonal bevel gear. In this case, the rotation shaft 23 extends in a direction (substantially horizontal direction) orthogonal to the axial direction X1 of the input shaft 30. When the second gear 84 is an angular bevel gear, the drive source 24 can be arranged at a lower level than that in the case where the second gear 84 is an orthogonal bevel gear.

The number of teeth of the second gear 84 is larger than the number of teeth of the first gear 83, and the number of teeth of the fourth gear 86 is larger than the number of teeth of the third gear 85. In other words, the speed reducing ratio of the first speed reducer 80 is larger than 1, and the speed reducing ratio of the second speed reducer 81 is larger than 1. Therefore, the speed of rotation to be transmitted from the rotation shaft 23 to the intermediate shaft 82 is reduced between the first gear 83 and the second gear 84, and the speed of rotation to be transmitted from the intermediate shaft 82 to the input shaft 30 is reduced between the third gear 85 and the fourth gear 86. That is, the speed of rotation from the left steering operation motor 4L is reduced in two steps by the first speed reducer 80 and the second speed reducer 81, and the rotation is transmitted to the input shaft 30. The speed reducing ratio of the entire left speed reducing mechanism 6L is preferably about 50 to 100.

The first speed reducer 80 is constituted by gears having a relatively high transmission efficiency, such as angular bevel gears or orthogonal bevel gears. The second speed reducer 81 is constituted by gears having a relatively high transmission efficiency, such as helical gears or spur gears. Therefore, the transmission efficiency of the left speed reducing mechanism 6L can be improved while reducing the speed of rotation of the left steering operation motor 4L in two steps. Thus, the transmission efficiency of the left speed reducing mechanism 6L is much higher than that of a speed reducing mechanism that is constituted by a worm and a worm wheel.

The bearing 26 provided between the first portion 92A of the gear housing 92 and the rotation shaft 23 may be constituted by, for example, a pair of angular contact ball bearings arranged adjacent to each other in the axial direction of the rotation shaft 23. In this case, the rotation shaft 23 is stably fixed to the gear housing 92, and therefore the first gear 83 and the second gear 84 stably mesh with each other. Next, details of the coupling mechanism 50 are described. The coupling mechanism 50 includes a first universal joint 51, the second universal joint 52, and a coupling shaft 53. The first universal joint 51 and the second universal joint 52 are capable of transmitting the drive force from the input shaft 30 to the output shaft 40 in a state in which the output shaft 40 is angularly offset from the input shaft 30 in two steps. The coupling shaft 53 couples the first universal joint 51 and the second universal joint 52 to each other. Specifically, the first universal joint 51 is capable of transmitting the drive force from the input shaft 30 to the coupling shaft 53 in a state in which the coupling shaft 53 is angularly offset from the input shaft 30. The second universal joint 52 is capable of transmitting the drive force from the coupling shaft 53 to the output shaft 40 in a state in which the output shaft 40 is angularly offset from the coupling shaft 53. The coupling shaft 53 has a central axis C3 that extends in a substantially vertical direction. The direction in which the central axis C3 extends is referred to as an axial direction X3 of the coupling shaft 53.

Figure 4:
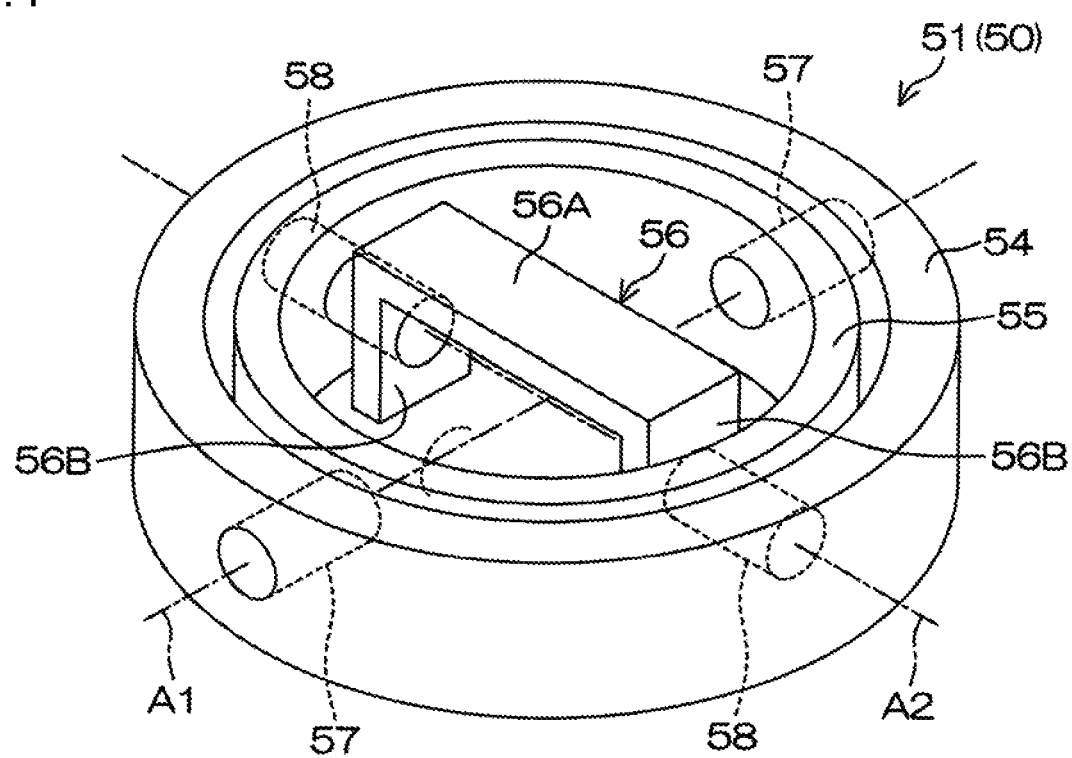
FIG. 4 is a schematic perspective view of a part of a coupling mechanism according to the first embodiment.

FIG. 4 is a schematic perspective view of the first universal joint 51. Referring to FIG. 3 and FIG. 4, the first universal joint 51 includes an outer annular member 54 and an inner annular member 55. The outer annular member 54 is coupled to the input shaft 30 so as to rotate together with the input shaft 30 about the central axis C1. The inner annular member 55 is coupled to the outer annular member 54, and is arranged on an inner side of the outer annular member 54. The first universal joint 51 further includes a yoke 56 coupled to the inner annular member 55, arranged on an inner side of the inner annular member 55, and coupled to the coupling shaft 53 so as to rotate together with the coupling shaft 53 about the central axis C3.

The outer annular member 54 and the inner annular member 55 are coupled to each other so as to be rotatable relative to each other about a rotation axis A1 orthogonal to the central axis C1 of the input shaft 30. The inner annular member 55 and the yoke 56 are coupled to each other so as to be rotatable relative to each other about a rotation axis A2 orthogonal to the central axis C3 of the coupling shaft 53 and to the rotation axis A1. The first universal joint 51 further includes a pair of first central shafts (first support shafts) 57 and a pair of second central shafts (second support shafts) 58. The first central shafts (first support shafts) 57 have the rotation axis A1, and couple the outer annular member 54 and the inner annular member 55 to each other so that the outer annular member 54 and the inner annular member 55 are rotatable relative to each other about the rotation axis A1. The second central shafts (second support shafts) 58 have the rotation axis A2, and couple the inner annular member 55 and the yoke 56 to each other so that the inner annular member 55 and the yoke 56 are rotatable relative to each other about the rotation axis A2.

The outer annular member 54 is coupled to the input shaft 30 by being, for example, press-fitted into the input shaft 30 from its lower side. In this manner, the first universal joint 51 is attached to the input shaft 30. The outer annular member 54 is positioned in the axial direction X1 of the input shaft 30 by a flange 31 provided at the upper end of the input shaft 30. The yoke 56 of the first universal joint 51 integrally includes a base portion 56A and a pair of arm portions 56B. The upper end of the coupling shaft 53 is fixed to the base portion 56A. The arm portions 56B respectively have insertion holes through which the corresponding second central shafts 58 are inserted, and extend from the base portion 56A toward the second universal joint 52.

The second universal joint 52 includes an outer annular member 60 and an inner annular member 61. The outer annular member 60 rotates together with the output shaft 40 about the central axis C2. The inner annular member 61 is coupled to the outer annular member 60, and is arranged on an inner side of the outer annular member 60. The second universal joint 52 further includes a yoke 62 coupled to the inner annular member 61, arranged on an inner side of the inner annular member 61, and coupled to the coupling shaft 53 so as to rotate together with the coupling shaft 53 about the central axis C3 of the coupling shaft 53.

The outer annular member 60 and the inner annular member 61 are coupled to each other so as to be rotatable relative to each other about a rotation axis A3 orthogonal to the central axis C2 of the output shaft 40. The inner annular member 61 and the yoke 62 are coupled to each other so as to be rotatable relative to each other about a rotation axis A4 orthogonal to the central axis C3 of the coupling shaft 53 and to the rotation axis A3. The second universal joint 52 further includes a pair of first central shafts (first support shafts) 63 and a pair of second central shafts (second support shafts) 64. The first central shafts (first support shafts) 63 have the rotation axis A3, and couple the outer annular member 60 and the inner annular member 61 to each other so that the outer annular member 60 and the inner annular member 61 are rotatable relative to each other about the rotation axis A3. The second central shafts (second support shafts) 64 have the rotation axis A4, and couple the inner annular member 61 and the yoke 62 to each other so that the inner annular member 61 and the yoke 62 are rotatable relative to each other about the rotation axis A4. FIG. 3 illustrates only one first central shaft 63 out of the pair of first central shafts 63.

The second universal joint 52 further includes an attachment member 65 for attaching the second universal joint 52 to the output shaft 40. The attachment member 65 is provided integrally with the outer annular member 60, and is fixed to the output shaft 40 by driving a screw (not illustrated) to tighten the upper end of the second shaft 42 of the output shaft 40. The yoke 62 of the second universal joint 52 integrally includes a base portion 62A and a pair of arm portions 62B. The lower end of the coupling shaft 53 is fixed to the base portion 62A. The arm portions 62B respectively have insertion holes through which the corresponding second central shafts 64 are inserted, and extend from the base portion 62A toward the first universal joint 51.

The coupling shaft 53 is, for example, a telescopic shaft that is extensible and contractible in the axial direction X3 of the coupling shaft 53. The coupling shaft 53 includes a first shaft 66 and a second shaft 67 that are movable relative to each other in the axial direction X3 and rotatable together about the central axis C3 of the coupling shaft 53. The first shaft 66 is inserted into the second shaft 67 from its upper side. The coupling shaft 53 further includes a plurality of balls (rigid balls) 68 arranged between the first shaft 66 and the second shaft 67 in array along the axial direction X3 of the coupling shaft 53. The balls 68 roll between the first shaft 66 and the second shaft 67, so that the first shaft 66 and the second shaft 67 are smoothly movable relative to each other in the axial direction X3 of the coupling shaft 53. Thus, the coupling shaft 53 functions as a movement mechanism configured to move the output shaft 40 relative to the coupling shaft 53 in the axial direction X3 of the coupling shaft 53.

In this embodiment, the first shaft 66 is inserted into the second shaft 67. Unlike this embodiment, the second shaft 67 may be inserted into the first shaft 66. In this embodiment, the balls 68 are arranged between the first shaft 66 and the second shaft 67. Unlike this embodiment, the first shaft 66 and the second shaft 67 may be coupled to each other by spline fitting. Due to assembling tolerances of the parts of the vehicle steering system 1 or loads input from the steered wheel 3R or 3L, the strut mount 18 is deflected and the pivot center C is shifted in vertical, lateral, and fore-and-aft directions. The steering operation causes precession of the central axis C2 about the kingpin axis K. As a result, the output shaft 40 is subjected to a load such that the input shaft 30 and the output shaft 40 deviate from their proper relative positions. In order to avoid stress concentration on the output shaft 40, it is necessary to sufficiently secure the amount of offset of the output shaft 40 from the input shaft 30.

According to the first embodiment, the input shaft 30 to which the drive force from the steering operation motor 4R or 4L is input and the output shaft 40 that outputs the drive force to the steered wheel 3R or 3L are coupled to each other by the coupling mechanism 50 including the first universal joint 51 and the second universal joint 52. The first universal joint 51 and the second universal joint 52 are capable of transmitting the drive force from the input shaft 30 to the output shaft 40 in a state in which the output shaft 40 is angularly offset from the input shaft 30. Therefore, the amount of angular offset of the output shaft 40 from the input shaft 30 can be secured sufficiently. Thus, even when the output shaft 40 is subjected to a load in a direction intersecting the axial direction X1 of the input shaft 30, the stress to be generated in the output shaft 40 can be reduced by angularly offsetting the output shaft 40 from the input shaft 30. The drive force can promptly be transmitted from the input shaft 30 to the output shaft 40 by the first universal joint 51 and the second universal joint 52 without interposing rubber between the input shaft 30 and the output shaft 40. Thus, the drive force from the steering operation motor 4R or 4L can accurately be transmitted to the steered wheel 3R or 3L. Accordingly, the steered wheel 3R or 3L can be steered accurately.

According to the first embodiment, the first universal joint 51 and the second universal joint 52 are capable of angularly offsetting the output shaft 40 from the input shaft 30 in two steps. Therefore, the amount of angular offset of the output shaft 40 from the input shaft 30 can be secured more sufficiently. The coupling shaft 53 can angularly be offset from the input shaft 30, and the output shaft 40 can angularly be offset from the coupling shaft 53. Thus, the output shaft 40 can be arranged relative to the input shaft 30 so that the central axis C1 of the input shaft 30 and the central axis C2 of the output shaft 40 are offset from each other in parallel. That is, the output shaft 40 can eccentrically be offset from the input shaft 30. Therefore, the stress to be generated in the output shaft 40 can further be reduced through the eccentric offset of the output shaft 40 from the input shaft 30 in addition to the angular offset of the output shaft 40 from the input shaft 30. Accordingly, the steered wheel 3R or 3L can be steered more accurately.

The first universal joint 51 and the second universal joint 52 transmit the rotation (drive force) of the input shaft 30 to the output shaft 40. Thus, the response of the steering wheel 2 for the steered wheel 3R or 3L is improved compared with the structure in which rubber is interposed between the input shaft 30 and the output shaft 40. Each of the first speed reducer 80 and the second speed reducer 81 is constituted by a pair of gears having a high transmission efficiency (pair of gears 83 and 84 or pair of gears 85 and 86), and therefore the speed reduction efficiency is high. Therefore, when the steered wheel 3R or 3L returns to a position where the vehicle travels straightforward from a position where the vehicle makes a turn, the steering wheel 2 promptly returns to its neutral steering position. The coupling mechanism 50 does not easily deteriorate compared with the structure in which rubber is interposed between the input shaft 30 and the output shaft 40. Accordingly, the durability is improved.

According to the first embodiment, the coupling shaft 53 serving as the movement mechanism extends and contracts to move the output shaft 40 relative to the coupling shaft 53 in the axial direction X3 of the coupling shaft 53. Even when the output shaft 40 is subjected to a load along the axial direction X3 of the coupling shaft 53, the stress to be generated in the output shaft 40 can be reduced, and therefore the steered wheel 3R or 3L can be steered more accurately. Even when the distance between the centers of the first universal joint 51 and the second universal joint 52 is varied due to the eccentric offset of the output shaft 40 from the input shaft 30, the variation can be absorbed.

According to the first embodiment, the cover 14 serving as the partition wall is provided between the steering operation motor 4R or 4L and the steered wheel 3R or 3L. Therefore, the steering operation motor 4R or 4L can be protected from mud, stones, or the like thrown up by the steered wheel 3R or 3L while the vehicle is traveling. Thus, the performance of the steering operation motor 4R or 4L is maintained. As a result, the drive force of the steering operation motor 4R or 4L can accurately be transmitted to the steered wheel 3R or 3L by the steering operation mechanism 5R or 5L. Accordingly, the steered wheel 3R or 3L can be steered accurately.

According to the first embodiment, at least a part of the steering operation motor 4R or 4L is arranged side by side with the first universal joint 51 in the direction orthogonal to the axial direction X1 of the input shaft 30. Therefore, the steering operation motor 4R or 4L and the steering operation mechanism 5R or 5L can be downsized in the axial direction X1 of the input shaft 30. Specifically, the bulk of the steering operation motor 4R or 4L and the steering operation mechanism 5R or 5L can be reduced in the axial direction X1 while arranging the steering operation motor 4R or 4L in the vehicle cabin or the engine compartment. Thus, the steering operation motor 4R or 4L can be protected while improving the mountability of the steering operation motor 4R or 4L and the steering operation mechanism 5R or 5L.

According to the first embodiment, the rotation shaft 23 of the steering operation motor 4R or 4L that is an electric motor extends in the direction intersecting the axial direction X1 of the input shaft 30. Therefore, the steering operation motor 4R or 4L and the steering operation mechanism 5R or 5L can further be downsized in the axial direction X1 of the input shaft 30. According to the first embodiment, the output shaft 40 is extensible and contractible in the axial direction X2 and is rotatable about the central axis C2. Therefore, the stress to be generated in the output shaft 40 can be reduced when the output shaft 40 outputs the drive force to the steered wheel 3R or 3L or when a load is transmitted to the output shaft 40 from the steered wheel 3R or 3L. As a result, the output shaft 40 can accurately output the drive force from the input shaft 30 to the steered wheel 3R or 3L. Thus, the steered wheel 3R or 3L can be steered accurately.

Figure 5:
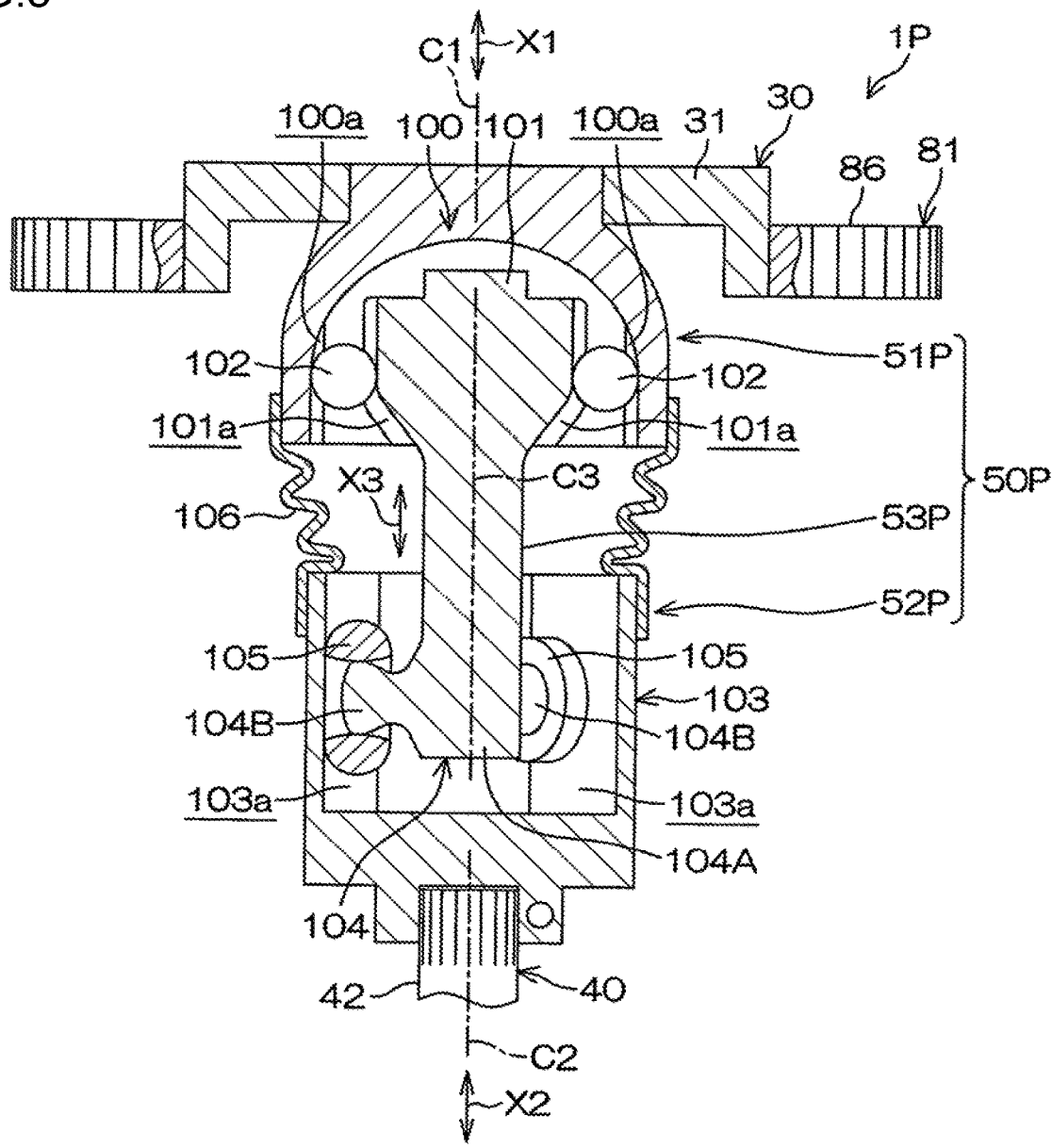
FIG. 5 is a sectional view schematically illustrating the periphery of a coupling mechanism of a vehicle steering system according to a second embodiment.

According to the first embodiment, the output shaft 40 is applicable to a strut damper for a MacPherson-type suspension, and therefore the versatility of the steering operation mechanism 5R or 5L can be improved. Unlike the first embodiment, the coupling mechanism 50 may include only the first universal joint 51 without including the second universal joint 52 and the coupling shaft 53, and the first universal joint 51 may be capable of transmitting the drive force from the input shaft 30 to the output shaft 40 in a state in which the output shaft 40 is angularly offset from the input shaft 30. In this case, the yoke 56 of the first universal joint 51 is coupled to the output shaft 40 so as to rotate together with the output shaft 40 about the central axis C2. FIG. 5 is a sectional view schematically illustrating the periphery of a coupling mechanism 50P of a vehicle steering system 1P according to a second embodiment. In the second embodiment of FIG. 5, the same members as the members described above are represented by the same reference symbols to omit their description.

The vehicle steering system 1P according to the second embodiment is mainly different from the vehicle steering system 1 according to the first embodiment (see FIG. 3) in the following points. A second universal joint 52P of the coupling mechanism 50P functions as a movement mechanism configured to move the output shaft 40 relative to a coupling shaft 53P in the axial direction X3 of the coupling shaft 53P. Further, unlike the coupling shaft 53 of the first embodiment, the coupling shaft 53P is a single shaft that neither extends nor contracts. Similarly to the coupling mechanism 50 of the first embodiment, a first universal joint 51P and the second universal joint 52P of the coupling mechanism 50P of the second embodiment transmit the drive force from the input shaft 30 to the output shaft 40 in a state in which the output shaft 40 is angularly offset from the input shaft 30 in two steps. Specifically, the first universal joint 51P transmits the drive force from the input shaft 30 to the coupling shaft 53P in a state in which the coupling shaft 53P is angularly offset from the input shaft 30. The second universal joint 52P transmits the drive force from the coupling shaft 53P to the output shaft 40 in a state in which the output shaft 40 is angularly offset from the coupling shaft 53P.

Specifically, the first universal joint 51P of the second embodiment is, for example, a ball-type constant velocity joint. The first universal joint 51P includes an outer ring 100, an inner ring 101, and a plurality of balls 102. The outer ring 100 rotates together with the input shaft 30 about the central axis C1. The inner ring 101 rotates together with the coupling shaft 53P about the central axis C3. The balls 102 are arranged between the outer ring 100 and the inner ring 101 so that power is transmitted between the outer ring 100 and the inner ring 101 and that the inner ring 101 can be tilted relative to the outer ring 100.

The outer ring 100 is fixed to the input shaft 30 by being press-fitted to the flange 31 provided at the upper end of the input shaft 30. The outer ring 100 has a bottomed tubular shape with an opening on its lower side. The inner ring 101 is inserted into the outer ring 100 from its lower side so as to be arranged on an inner side of the outer ring 100. The inner ring 101 is provided at the upper end of the coupling shaft 53P. The balls 102 are arranged between the outer ring 100 and the inner ring 101 in array along a circumferential direction.

The inner peripheral surface of the outer ring 100 is provided with the same number of outer ring grooves 100a as the balls 102. The outer peripheral surface of the inner ring 101 is provided with the same number of inner ring grooves 101a as the balls 102. Each ball 102 is fitted to both of the outer ring groove 100a and the inner ring groove 101a, and is capable of transmitting power between the outer ring 100 and the inner ring 101. Each ball 102 rolls along the bottom surface of the corresponding outer ring groove 100a and along the bottom surface of the corresponding inner ring groove 101a. Thus, the coupling shaft 53P to which the inner ring 101 is fixed can angularly be offset from the input shaft 30 to which the outer ring 100 is fixed.

The second universal joint 52P of the second embodiment is a tripod-type constant velocity joint. The second universal joint 52P includes an outer ring 103 and a trunnion 104. The outer ring 103 rotates together with the output shaft 40 about the central axis C2. The trunnion 104 rotates together with the coupling shaft 53P about the central axis C3. The second universal joint 52P further includes a plurality of rollers 105 arranged between the outer ring 103 and the trunnion 104 so that power is transmitted between the outer ring 103 and the trunnion 104 and that the trunnion 104 can be tilted relative to the outer ring 103.

The outer ring 103 is fixed to the output shaft 40 by being fastened with a screw in a state in which the outer ring 103 is fitted to the upper end of the output shaft 40 by, for example, serrations. The outer ring 103 has a bottomed tubular shape with an opening on its upper side. The trunnion 104 is inserted into the outer ring 103 from its upper side so as to be arranged on an inner side of the outer ring 103. The trunnion 104 is provided at the lower end of the coupling shaft 53P. The rollers 105 are arranged between the outer ring 103 and the trunnion 104 in array along a circumferential direction.

The inner peripheral surface of the outer ring 103 is provided with the same number of guide grooves 103a as the rollers 105. The guide grooves 103a guide the trunnion 104 and the rollers 105 along the axial direction X2 of the output shaft 40. The trunnion 104 includes a base portion 104A coupled to the coupling shaft 53P, and a plurality of shaft portions 104B (the same number of shaft portions 104B as the rollers 105) protruding radially outward from the base portion 104A. Each roller 105 is attached to the corresponding shaft portion 104B of the trunnion 104 so as to be rotatable about the shaft portion 104B. Each roller 105 is fitted to the corresponding guide groove 103a so that power can be transmitted between the outer ring 103 and the trunnion 104. With this roller 105, power can be transmitted between the outer ring 103 and the trunnion 104. Each roller 105 is movable relative to the corresponding shaft portion 104B in an axial direction of the shaft portion 104B, rockable on the corresponding shaft portion 104B, and rotatable about the corresponding shaft portion 104B. Thus, the output shaft 40 to which the outer ring 103 is fixed can angularly be offset from the coupling shaft 53P to which the trunnion 104 is fixed.

By moving the rollers 105 and the trunnion 104 of the second universal joint 52P in the axial direction X3 along the guide grooves 103a, the output shaft 40 can be moved relative to the coupling shaft 53P in the axial direction X3 of the coupling shaft 53P. Bellows 106 may be provided so as to impart a waterproof property between the first universal joint 51P and the second universal joint 52P. According to the second embodiment, effects similar to those of the first embodiment are attained.

According to the second embodiment, in the second universal joint 52P serving as the movement mechanism, the trunnion 104 moves relative to the outer ring 103. Thus, the output shaft 40 moves relative to the coupling shaft 53P in the axial direction X3 of the coupling shaft 53P. Therefore, even when the output shaft 40 is subjected to a load along the axial direction X3 of the coupling shaft 53P, the stress to be generated in the output shaft 40 can be reduced, and therefore the steered wheel 3R or 3L can be steered accurately.

Unlike the second embodiment, the coupling mechanism 50P may include only the first universal joint 51P without including the second universal joint 52P and the coupling shaft 53P, and the first universal joint 51P may be capable of transmitting the drive force from the input shaft 30 to the output shaft 40 in a state in which the output shaft 40 is angularly offset from the input shaft 30. In this case, the inner ring 101 of the first universal joint 51P is coupled to the output shaft 40 so as to rotate together with the output shaft 40 about the central axis C2.

Unlike the second embodiment, the coupling mechanism 50P may include only the second universal joint 52P without including the first universal joint 51P and the coupling shaft 53P, and the second universal joint 52P may be capable of transmitting the drive force from the input shaft 30 to the output shaft 40 in a state in which the output shaft 40 is angularly offset from the input shaft 30. In this case, the trunnion 104 of the second universal joint 52P is coupled to the input shaft 30 so as to rotate together with the input shaft 30 about the central axis C1.

Figure 6:
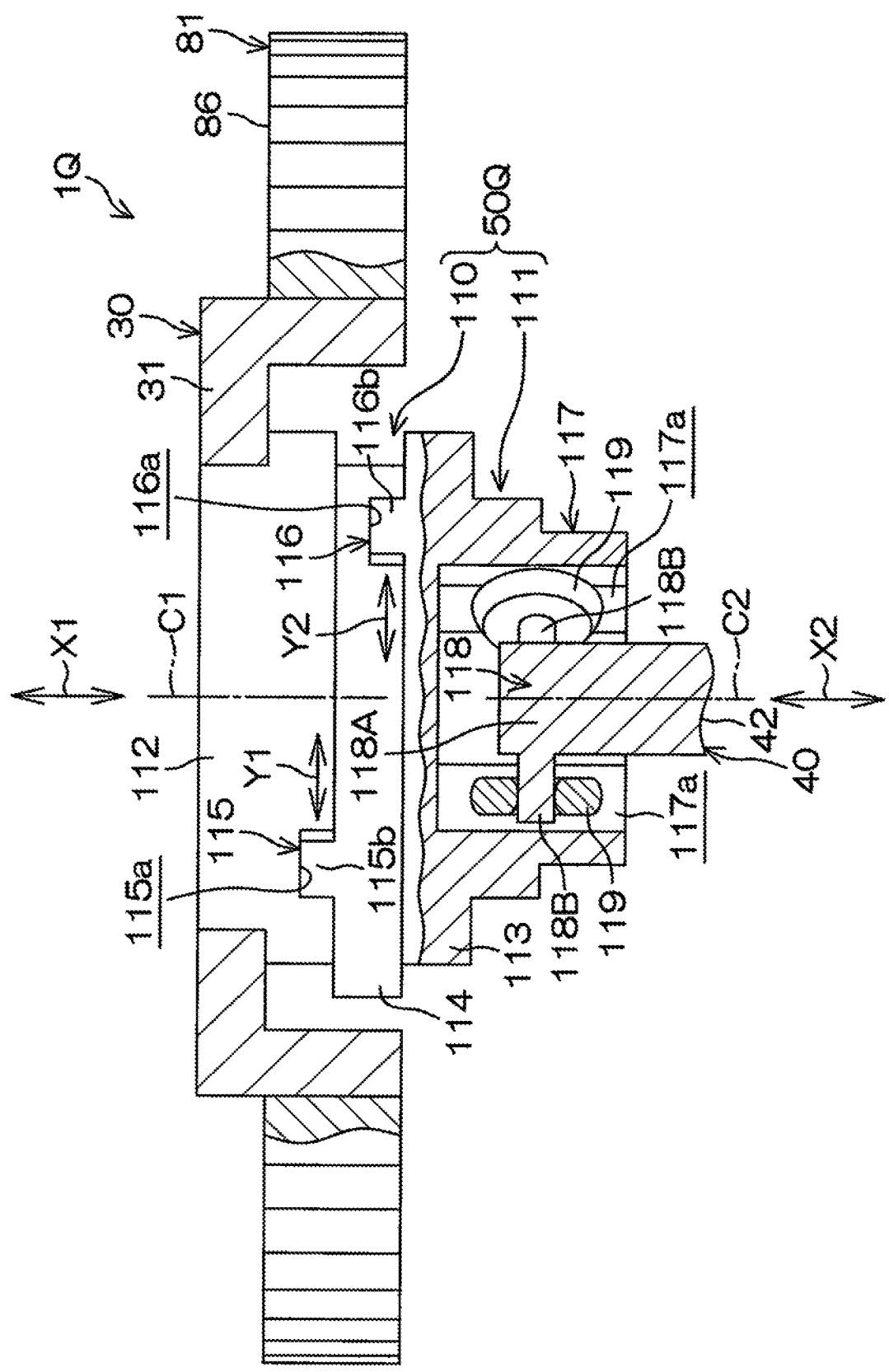
FIG. 6 is a sectional view schematically illustrating the periphery of a coupling mechanism of a vehicle steering system according to a third embodiment.

Unlike the second embodiment, in the first universal joint 51P, the inner ring 101 may be coupled to the input shaft 30, and the outer ring 100 may be coupled to the coupling shaft 53P. In the second universal joint 52P, the outer ring 103 may be coupled to the coupling shaft 53P, and the trunnion 104 may be coupled to the output shaft 40. FIG. 6 is a sectional view schematically illustrating the periphery of a coupling mechanism 50Q of a vehicle steering system 1Q according to a third embodiment. In the third embodiment of FIG. 6, the same members as the members described above are represented by the same reference symbols to omit their description.

The vehicle steering system 1Q according to the third embodiment is mainly different from the vehicle steering system 1 according to the first embodiment (see FIG. 3) in the following points. In place of the first universal joint 51, the second universal joint 52, and the coupling shaft 53, the coupling mechanism 50Q includes an eccentric coupling 110 configured to eccentrically offset the output shaft 40 from the input shaft 30, and a universal joint 111 configured to angularly offset the output shaft 40 from the input shaft 30. Further, the eccentric coupling 110 and the universal joint 111 transmit the drive force from the input shaft 30 to the output shaft 40. The eccentric coupling 110 is capable of transmitting the drive force from the input shaft 30 to the universal joint 111. The universal joint 111 is capable of transmitting the drive force from the eccentric coupling 110 to the output shaft 40.

The eccentric coupling 110 is an Oldham coupling. The eccentric coupling 110 rotates together with the input shaft 30 about the central axis C1. The eccentric coupling 110 includes a first coupling member 112, a second coupling member 113, and an intermediate member 114. The first coupling member 112 is fixed to the input shaft 30. The second coupling member 113 is coupled to the output shaft 40 via the universal joint 111. The intermediate member 114 is arranged between the first coupling member 112 and the second coupling member 113. The first coupling member 112 is fixed to the input shaft 30 by being press-fitted to the flange 31 provided at the upper end of the input shaft 30.

The eccentric coupling 110 further includes a first orthogonal movement mechanism 115 and a second orthogonal movement mechanism 116. The first orthogonal movement mechanism 115 moves the intermediate member 114 relative to the first coupling member 112 in a direction orthogonal to the axial direction X1. The second orthogonal movement mechanism 116 moves the second coupling member 113 relative to the intermediate member 114 in a direction orthogonal to the axial direction X1. The direction in which the intermediate member 114 moves relative to the first coupling member 112 is defined as a first orthogonal direction Y1. The direction in which the second coupling member 113 moves relative to the intermediate member 114 is defined as a second orthogonal direction Y2. The first orthogonal direction Y1 and the second orthogonal direction Y2 are orthogonal to each other.

The first orthogonal movement mechanism 115 includes a first recessed portion 115a and a first projecting portion 115b. The first recessed portion 115a is provided on the end face of the first coupling member 112 that is located on a lower side in the axial direction X1 of the input shaft 30, and extends in the first orthogonal direction Y1. The first projecting portion 115b is provided on the end face of the intermediate member 114 that is located on an upper side in the axial direction X1, and is fitted to the first recessed portion 115a so that the drive force can be transmitted from the first coupling member 112 to the intermediate member 114. The second orthogonal movement mechanism 116 includes a second recessed portion 116a and a second projecting portion 116b. The second recessed portion 116a is provided on the end face of the intermediate member 114 that is located on a lower side in the axial direction X1 of the input shaft 30, and extends in the second orthogonal direction Y2. The second projecting portion 116b is provided on the end face of the second coupling member 113 that is located on an upper side in the axial direction X1, and is fitted to the second recessed portion 116a so that the drive force can be transmitted from the intermediate member 114 to the second coupling member 113.

The first orthogonal movement mechanism 115 moves the intermediate member 114 relative to the first coupling member 112 in the first orthogonal direction Y1, and the second orthogonal movement mechanism 116 moves the second coupling member 113 relative to the intermediate member 114 in the second orthogonal direction Y2, so that the output shaft 40 can eccentrically be offset from the input shaft 30. The universal joint 111 is a tripod-type constant velocity joint. The universal joint 111 includes an outer ring 117 and a trunnion 118. The outer ring 117 rotates together with the second coupling member 113 of the eccentric coupling 110 about the central axis C1 of the input shaft 30. The trunnion 118 rotates together with the output shaft 40 about the central axis C2. The universal joint 111 further includes a plurality of rollers 119 arranged between the outer ring 117 and the trunnion 118 so that power is transmitted between the outer ring 117 and the trunnion 118 and that the trunnion 118 can be tilted relative to the outer ring 117.

The outer ring 117 has a bottomed tubular shape with an opening on its lower side. The trunnion 118 is inserted into the outer ring 117 from its lower side so as to be arranged on an inner side of the outer ring 117. The trunnion 118 is provided at the upper end of the output shaft 40. The rollers 119 are arranged between the outer ring 117 and the trunnion 118 in array along a circumferential direction. The inner peripheral surface of the outer ring 117 is provided with the same number of guide grooves 117a as the rollers 119. The guide grooves 117a extend along the axial direction X1 of the input shaft 30. The trunnion 118 includes a base portion 118A and a plurality of shaft portions 118B (the same number of shaft portions 118B as the rollers 119). The base portion 118A is coupled to the output shaft 40. The shaft portions 118B protrude radially outward from the base portion 118A. Each roller 119 is attached to the corresponding shaft portion 118B of the trunnion 118 so as to be rotatable about the shaft portion 118B. Each roller 119 is fitted to the corresponding guide groove 117a so that power can be transmitted between the outer ring 117 and the trunnion 118. Each roller 119 is movable relative to the corresponding shaft portion 118B in an axial direction of the shaft portion 118B, rockable on the corresponding shaft portion 118B, and rotatable about the corresponding shaft portion 118B. Thus, the output shaft 40 to which the trunnion 118 is fixed can angularly be offset from the input shaft 30 to which the outer ring 117 is coupled via the eccentric coupling 110.

By moving the rollers 119 and the trunnion 118 of the universal joint 111 in the axial direction X2 along the guide grooves 117a, the output shaft 40 can be moved relative to the input shaft 30 in the axial direction X2 of the output shaft 40. According to the third embodiment, effects similar to those of the first embodiment are attained. According to the third embodiment, in the universal joint 111 serving as the movement mechanism, the trunnion 118 moves relative to the outer ring 117. Thus, the output shaft 40 moves relative to the input shaft 30 in the axial direction X1 of the input shaft 30. Therefore, even when the output shaft 40 is subjected to a load along the axial direction X1 of the input shaft 30, the stress to be generated in the output shaft 40 can be reduced, and therefore the steered wheel 3R or 3L can be steered accurately.

According to the third embodiment, the eccentric coupling 110 eccentrically offsets the output shaft 40 from the input shaft 30. Therefore, the output shaft 40 can output the drive force from the input shaft 30 to the steered wheel 3R or 3L in a state in which the output shaft 40 is angularly and eccentrically offset from the input shaft 30. Thus, the stress to be generated in the output shaft 40 can further be reduced, and therefore the steered wheel 3R or 3L can be steered more accurately.

Figure 7:
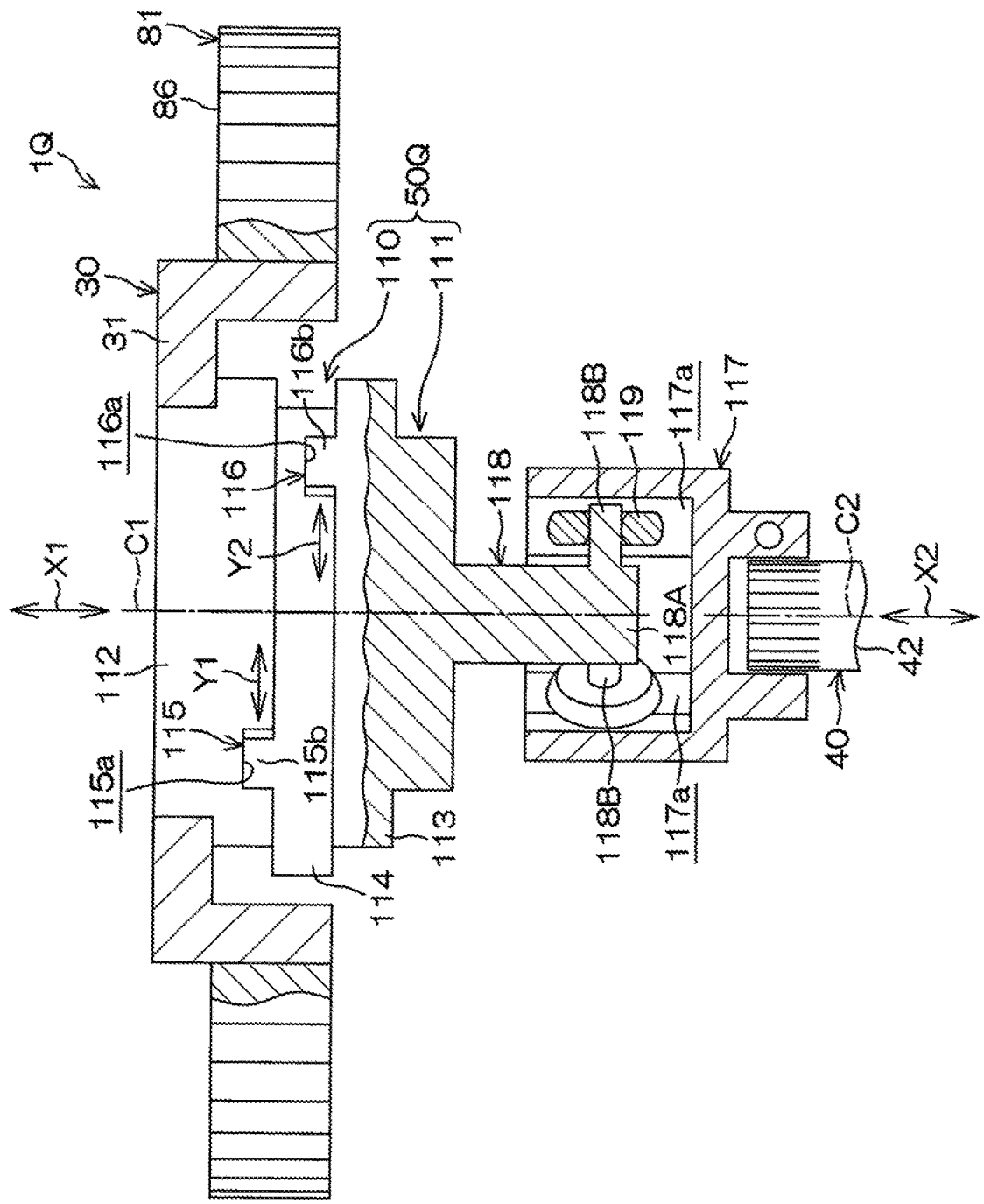
FIG. 7 is a sectional view schematically illustrating the periphery of a coupling mechanism of a vehicle steering system according to a modified example of the third embodiment.

Unlike the third embodiment, the universal joint 111 of the coupling mechanism 50Q may include the trunnion 118 and the outer ring 117 as illustrated in FIG. 7. The trunnion 118 rotates together with the second coupling member 113 of the eccentric coupling 110 about the central axis C1 of the input shaft 30. The outer ring 117 rotates together with the output shaft 40 about the central axis C2. The trunnion 118 is formed integrally with the second coupling member 113. The outer ring 117 is fixed to the output shaft 40 by being fastened with a screw in a state in which the outer ring 117 is fitted to the upper end of the output shaft 40 by, for example, serrations.

Figure 8:
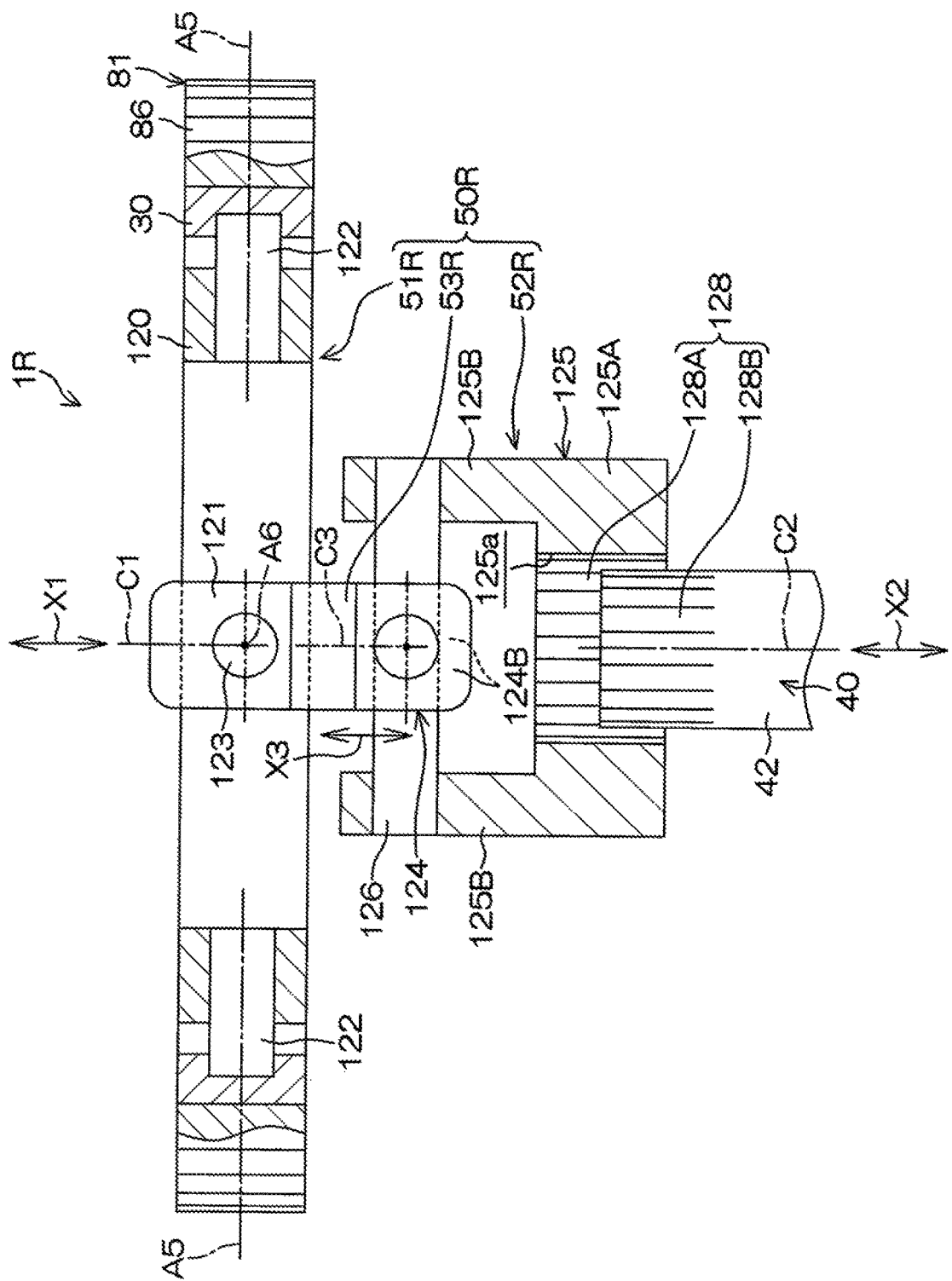
FIG. 8 is a sectional view schematically illustrating the periphery of a coupling mechanism of a vehicle steering system according to a fourth embodiment.

Also in this structure, effects similar to those of the structure illustrated in FIG. 6 are attained. In this structure, the outer ring 117 has a bottomed tubular shape with an opening on its upper side. Therefore, grease is easily retained in the outer ring 117. The grease is housed in the outer ring 117 so as to reduce friction between the roller 119 and the guide groove 117a and between the roller 119 and the shaft portion 118B. FIG. 8 is a sectional view schematically illustrating the periphery of a coupling mechanism 50R of a vehicle steering system 1R according to a fourth embodiment. In the fourth embodiment of FIG. 8, the same members as the members described above are represented by the same reference symbols to omit their description.

The vehicle steering system 1R according to the fourth embodiment is mainly different from the vehicle steering system 1 according to the first embodiment (see FIG. 3) in the following points. The coupling mechanism 50R includes a movement mechanism 128 configured to move the output shaft 40 relative to a coupling shaft 53R in the axial direction X2 of the output shaft 40. Further, the coupling shaft 53R is a single shaft that neither extends nor contracts. Specifically, the coupling mechanism 50R includes a first universal joint 51R, a second universal joint 52R, and the coupling shaft 53R. The first universal joint 51R and the second universal joint 52R are capable of transmitting the drive force from the input shaft 30 to the output shaft 40 in a state in which the output shaft 40 is angularly offset from the input shaft 30 in two steps. The coupling shaft 53R couples the first universal joint 51R and the second universal joint 52R to each other. The first universal joint 51R is capable of transmitting the drive force from the input shaft 30 to the coupling shaft 53R in a state in which the coupling shaft 53R is angularly offset from the input shaft 30. The second universal joint 52R is capable of transmitting the drive force from the coupling shaft 53R to the output shaft 40 in a state in which the output shaft 40 is angularly offset from the coupling shaft 53R.

The first universal joint 51R includes an annular member 120 and a joint member 121. The annular member 120 is coupled to the input shaft 30 so as to rotate together with the input shaft 30 about the central axis C1. The joint member 121 is coupled to the annular member 120, arranged on an inner side of the annular member 120, and coupled to the coupling shaft 53R so as to rotate together with the coupling shaft 53R about the central axis C3 of the coupling shaft 53R. The annular member 120 and the input shaft 30 are coupled to each other so as to be rotatable relative to each other about a rotation axis A5 orthogonal to the central axis C1 of the input shaft 30. The annular member 120 and the joint member 121 are coupled to each other so as to be rotatable relative to each other about a rotation axis A6 orthogonal to the central axis C3 of the coupling shaft 53R and to the rotation axis A5.

The first universal joint 51R further includes a pair of first central shafts (first support shafts) 122 and a second central shaft (second support shaft) 123. The first central shafts 122 have the rotation axis A5, and couple the input shaft 30 and the annular member 120 to each other so that the input shaft 30 and the annular member 120 are rotatable relative to each other about the rotation axis A5. The second central shaft 123 has the rotation axis A6, and couples the annular member 120 and the joint member 121 to each other so that the annular member 120 and the joint member 121 are rotatable relative to each other about the rotation axis A6. The input shaft 30 is inserted into the fourth gear 86 of the second speed reducer 81 in a press-fitted state so as to rotate together with the fourth gear 86. Unlike this embodiment, the input shaft 30 may be formed integrally with the fourth gear 86 of the second speed reducer 81. The joint member 121 is coupled to one end of the coupling shaft 53R.

The second universal joint 52R includes a first yoke 124, a second yoke 125, and a joint spider 126. The first yoke 124 is coupled to the lower end of the coupling shaft 53R. The second yoke 125 is coupled to the output shaft 40. The joint spider 126 couples the first yoke 124 and the second yoke 125 to each other. The first yoke 124 of the second universal joint 52R includes a pair of arm portions 124B coupled to the lower end of the coupling shaft 53R and facing each other. The second yoke 125 of the second universal joint 52R includes a base portion 125A to which the upper end of the output shaft 40 is fixed, and a pair of arm portions 125B supported by the base portion 125A and facing each other. The joint spider 126 is coupled to the arm portions 124B and the arm portions 125B.

The movement mechanism 128 is constituted by the second universal joint 52R and the output shaft 40 that are fitted to each other by splines. Specifically, the movement mechanism 128 includes an internal spline 128A and an external spline 128B. The internal spline 128A is formed on the inner periphery of an insertion hole 125a, which is formed in the base portion 125A of the second yoke 125 and through which the upper end of the output shaft 40 is inserted. The external spline 128B is fitted to the internal spline 128A, and is formed on the outer periphery of the upper end of the output shaft 40. Therefore, the output shaft 40 is movable relative to the second universal joint 52R and the coupling shaft 53R in the axial direction X2 of the output shaft 40. Unlike this embodiment, a plurality of balls arrayed along the axial direction X2 of the output shaft 40 may be provided between the second universal joint 52R and the output shaft 40, and the movement mechanism 128 may be constituted by the second universal joint 52R, the output shaft 40, and the balls.

According to the fourth embodiment, effects similar to those of the first embodiment are attained. According to the fourth embodiment, the movement mechanism 128 moves the output shaft 40 relative to the input shaft 30 in the axial direction X2 of the output shaft 40. Therefore, even when the output shaft 40 is subjected to a load along the axial direction X2 of the output shaft 40, the stress to be generated in the output shaft 40 can be reduced, and therefore the steered wheel 3R or 3L can be steered accurately.

Unlike the fourth embodiment, the coupling mechanism 50R may include only the first universal joint 51R without including the second universal joint 52R and the coupling shaft 53R, and the first universal joint 51R may be capable of transmitting the drive force from the input shaft 30 to the output shaft 40 in a state in which the output shaft 40 is angularly offset from the input shaft 30. In this case, the joint member 121 of the first universal joint 51R is coupled to the output shaft 40 so as to rotate together with the output shaft 40 about the central axis C2.

Figure 9:
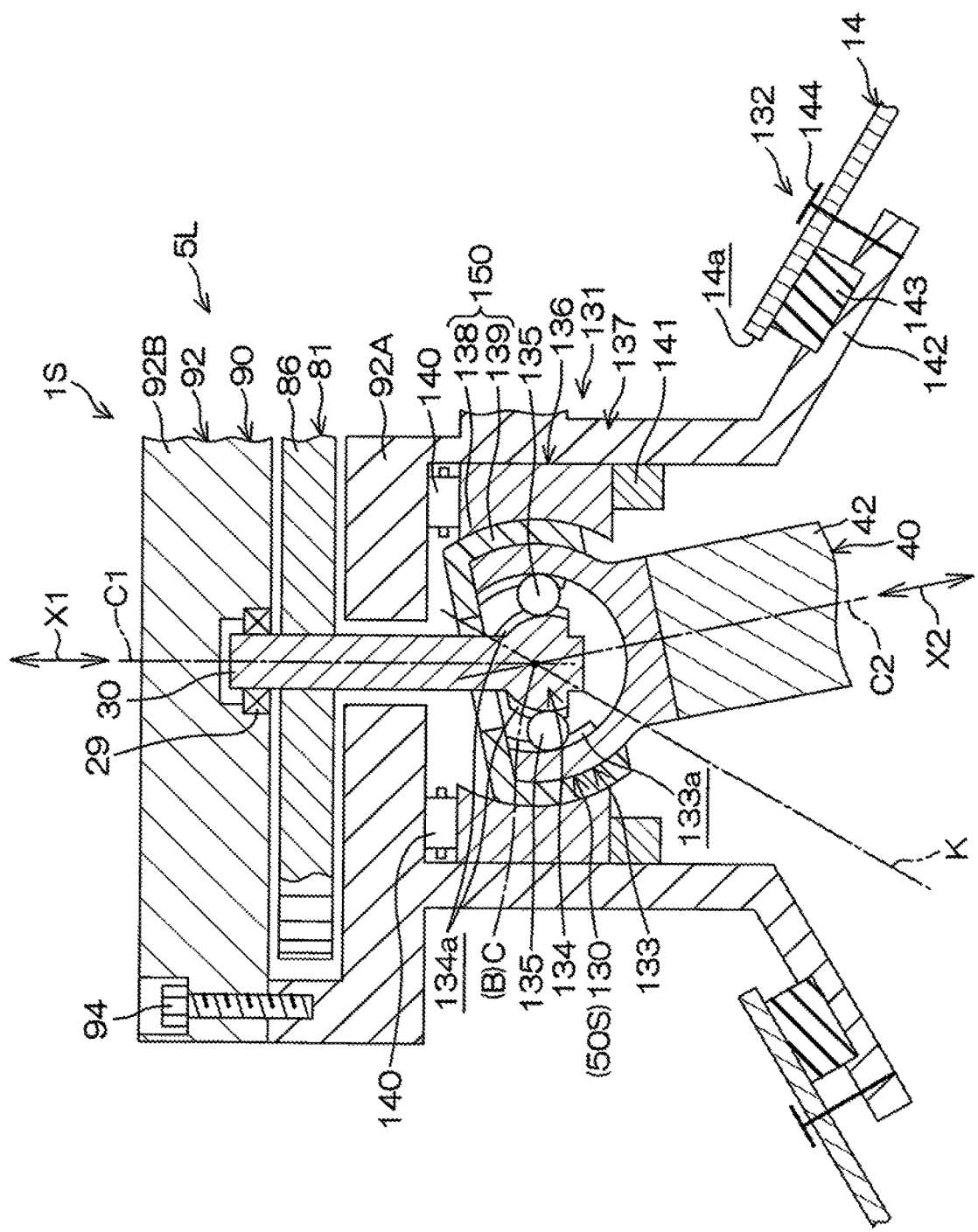
FIG. 9 is a sectional view schematically illustrating the periphery of a coupling mechanism of a vehicle steering system according to a fifth embodiment.

FIG. 9 is a sectional view schematically illustrating the periphery of a coupling mechanism 50S of a vehicle steering system 1S according to a fifth embodiment. In the fifth embodiment of FIG. 9, the same members as the members described above are represented by the same reference symbols to omit their description. The vehicle steering system 1S according to the fifth embodiment is mainly different from the vehicle steering system 1 according to the first embodiment (see FIG. 3) in the following points. The coupling mechanism 50S includes a universal joint 130 in place of the first universal joint 51, the second universal joint 52, and the coupling shaft 53. Further, the steering operation mechanism 5R or 5L includes a universal joint support mechanism 131. Still further, the steering operation mechanism 5R or 5L includes an elastic support mechanism 132 in place of the strut mount 18 of the first embodiment (see FIG. 2).

The universal joint 130 is capable of transmitting the drive force from the input shaft 30 to the output shaft 40 in a state in which the output shaft 40 is angularly offset from the input shaft 30. The universal joint support mechanism 131 supports the universal joint 130 so that the universal joint 130 is rotatable about the central axis C1 of the input shaft 30. The elastic support mechanism 132 elastically supports the housing 90 so that the housing 90 is movable relative to the vehicle body. In the first embodiment, the input shaft 30 has a cylindrical shape, but in the fifth embodiment, the input shaft 30 has a columnar shape that extends in a substantially vertical direction.

The universal joint 130 is a ball-type constant velocity joint. The universal joint 130 includes an outer ring 133, an inner ring 134, and a plurality of balls 135. The outer ring 133 rotates together with the output shaft 40 about the central axis C2. The inner ring 134 rotates together with the input shaft 30 about the central axis C1. The balls 135 are arranged between the outer ring 133 and the inner ring 134 so that power is transmitted between the outer ring 133 and the inner ring 134 and that the inner ring 134 can be tilted relative to the outer ring 133. The outer ring 133 has a bottomed tubular shape with an opening on its upper side.

The outer ring 133 is fixed to the output shaft 40 by being coupled to the upper end of the output shaft 40. The inner ring 134 is fixed to the input shaft 30 by being coupled to the lower end of the input shaft 30. The inner ring 134 is inserted into the outer ring 133 from its upper side so as to be arranged on an inner side of the outer ring 133. The balls 135 are arranged between the outer ring 133 and the inner ring 134 in array along a circumferential direction.

The inner peripheral surface of the outer ring 133 is provided with the same number of outer ring grooves 133a as the balls 135. The outer peripheral surface of the inner ring 134 is provided with the same number of inner ring grooves 134a as the balls 135. Each ball 135 is fitted to both of the outer ring groove 133a and the inner ring groove 134a, and is capable of transmitting power between the outer ring 133 and the inner ring 134. Each ball 135 rolls along the bottom surface of the corresponding outer ring groove 133a and along the bottom surface of the corresponding inner ring groove 134a. Thus, the output shaft 40 to which the outer ring 133 is fixed can angularly be offset from the input shaft 30 to which the inner ring 134 is fixed.

The universal joint support mechanism 131 includes a support member 136 and a housing member 137. The support member 136 supports the universal joint 130 so that the universal joint 130 is rotatable about a central axis. The housing member 137 extends downward from the gear housing 92 of the housing 90, and houses the support member 136. The housing member 137 is formed integrally with the first portion 92A of the gear housing 92. The support member 136 is attached to the housing 90 via the housing member 137. The support member 136 is rotatable relative to the housing member 137 about the central axis C1. The universal joint 130 is tiltable relative to the support member 136. The housing member 137 has a bottomed tubular shape that is open on its lower side.

A portion of the support member 136 that supports the universal joint 130 and a portion of the universal joint 130 that is supported by the support member 136 constitute a spherical bearing 150. That is, the portion of the support member 136 that supports the universal joint 130 corresponds to an outer ring 138 of the spherical bearing 150. The portion of the universal joint 130 that is supported by the support member 136 corresponds to an inner ring 139 of the spherical bearing 150. The coupling mechanism 50S is provided with one universal joint 130 and one support member 136, and the rotation center of the spherical bearing 150 and the angular offset center B of the universal joint 130 coincide with each other.

The universal joint support mechanism 131 further includes rolling elements 140 for smoothly rotating the support member 136 relative to the housing member 137. The rolling element 140 is, for example, a roller, and is provided between the upper surface of the outer ring 138 and the bottom surface of the housing member 137. A plurality of rolling elements 140 are provided with intervals therebetween in a circumferential direction about the central axis C1. The housing member 137 is provided with a stopper 141 that abuts against the support member 136 from its lower side so as to retain the support member 136 in the housing member 137. In the fifth embodiment, the stopper 141 is a member that is separate from the housing member 137, and is fixed to the inner peripheral surface of the housing member 137 by press fitting or the like.

The elastic support mechanism 132 includes a fixing member 142, an elastic member 143 such as rubber, and a coupling member 144. The fixing member 142 is fixed to the housing 90 via the housing member 137. The elastic member 143 such as rubber is provided between the cover 14 fixed to the vehicle body and the fixing member 142, and is elastically deformable. The coupling member 144 couples the cover 14 and the fixing member 142 to each other with a clearance therebetween. The fixing member 142 has a flange shape that expands radially outward from the lower end of the housing member 137. Therefore, the elastic member 143 has a ring shape with a bore diameter and an outside diameter that are larger than those of the strut mount 18 of the first embodiment. Thus, the elastic member 143 has sufficient rigidity, and can therefore bear (receive) a steering reaction force with a small elastic deformation amount during the steering operation. Accordingly, the left steered wheel 3L can be steered accurately.

According to the fifth embodiment, the input shaft 30 to which the drive force from the steering operation motor 4R or 4L is input and the output shaft 40 that outputs the drive force to the steered wheel 3R or 3L are coupled to each other by the coupling mechanism 50S including the universal joint 130. The universal joint 130 angularly offsets the output shaft 40 from the input shaft 30. Therefore, the amount of angular offset of the output shaft 40 from the input shaft 30 can be secured sufficiently. Thus, even when the output shaft 40 is subjected to a load in a direction intersecting the axial direction X1 of the input shaft 30, the stress to be generated in the output shaft 40 can be reduced by angularly offsetting the output shaft 40 from the input shaft 30. The drive force can promptly be transmitted from the input shaft 30 to the output shaft 40 by the universal joint 130 without interposing rubber between the input shaft 30 and the output shaft 40. Thus, the drive force from the steering operation motor 4R or 4L can accurately be transmitted to the steered wheel 3R or 3L. Accordingly, the steered wheel 3R or 3L can be steered accurately.

According to the fifth embodiment, the support member 136 supports the universal joint 130 so that the universal joint 130 is rotatable about the central axis C1 of the input shaft 30. The support member 136 is attached to the housing 90 that is movable relative to the vehicle body. Therefore, the input shaft 30, the output shaft 40, and the coupling mechanism 50S can be moved together with the housing 90 relative to the vehicle body. Thus, even when the output shaft 40 is subjected to a load, the stress to be generated in the output shaft 40 can be reduced by moving the input shaft 30, the output shaft 40, the coupling mechanism 50S, and the housing 90 together. Further, a burden on the steering operation motor 4R or 4L housed in the housing 90 can be reduced. Thus, the steered wheel 3R or 3L can be steered more accurately.

According to the fifth embodiment, the portion of the support member 136 (outer ring 138) that supports the universal joint 130 and the portion of the universal joint 130 (inner ring 139) that is supported by the support member 136 constitute the spherical bearing 150. The angular offset center B of the universal joint 130 and the rotation center of the spherical bearing 150 coincide with each other. By using one universal joint 130 and one support member 136, the output shaft 40 can be pivoted in a state in which the angular offset center B of the universal joint 130 and the pivot center C of the output shaft 40 coincide with each other. That is, the eccentric offset of the output shaft 40 from the input shaft 30 can be allowed without providing a plurality of universal joints 130 and a plurality of support members 136. Further, there is no need to arrange a plurality of universal joints 130 in array along the vertical direction (axial direction X1). Therefore, the coupling mechanism 50S can be made compact in the axial direction X1.

Figure 10:
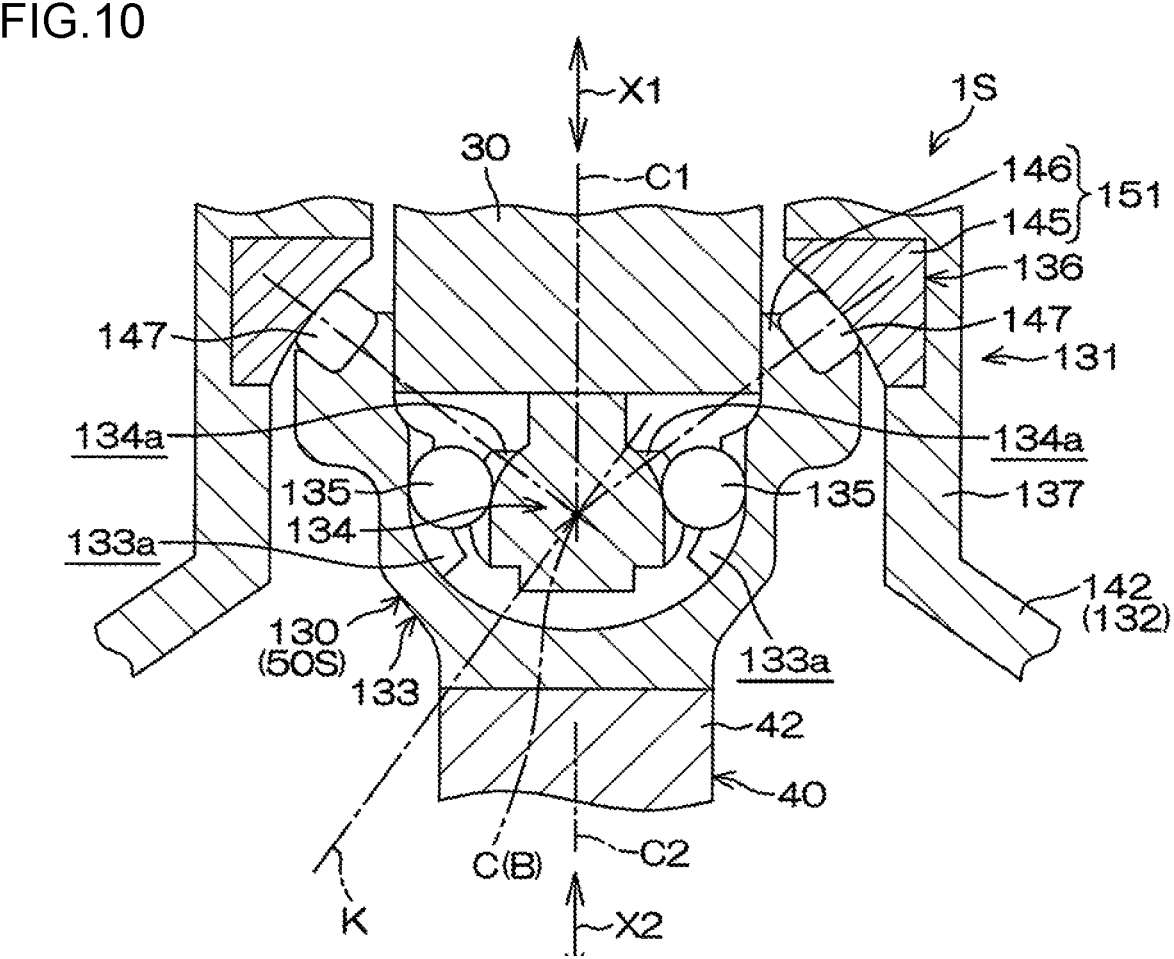
FIG. 10 is a sectional view schematically illustrating the periphery of a coupling mechanism of a vehicle steering system according to a modified example of the fifth embodiment.

Unlike the fifth embodiment, as illustrated in FIG. 10, a portion of the support member 136 (outer ring 145) that supports the universal joint 130 and a portion of the universal joint 130 (inner ring 146) that is supported by the support member 136 may constitute a spherical thrust roller bearing 151. That is, the portion of the support member 136 that supports the universal joint 130 corresponds to the outer ring 145 of the spherical thrust roller bearing 151, and the portion of the universal joint 130 that is supported by the support member 136 corresponds to the inner ring 146 of the spherical thrust roller bearing 151. The coupling mechanism 50S is provided with one universal joint 130 and one support member 136, and the rotation center of the spherical thrust roller bearing 151 and the angular offset center B of the universal joint 130 coincide with each other.

The spherical thrust roller bearing 151 includes the outer ring 145, the inner ring 146, and a plurality of rollers 147. The outer ring 145 is fixed to the housing member 137. The inner ring 146 is rotatable together with the output shaft 40 about the central axis C2. The rollers 147 are arranged between the inner ring 146 and the outer ring 145. The rotation center of the spherical thrust roller bearing 151 coincides with the angular offset center B of the universal joint 130, and therefore effects similar to those of the structure illustrated in FIG. 9 are attained. The inner ring 146 is preferably formed integrally with the outer ring 133 of the universal joint 130. Thus, the load applied to the output shaft 40 is borne (received) by the housing member 137 via the outer ring 133 and the inner ring 146. Therefore, the load to be applied to the universal joint 130 can be reduced. Accordingly, the left steered wheel 3L can be steered accurately.

In the fifth embodiment, the universal joint 130 is a ball-type constant velocity joint. Unlike the fifth embodiment, the universal joint 130 may be a tripod-type constant velocity joint. In this case, the universal joint 130 has a structure similar to that of the second universal joint 52P of the second embodiment. Although illustration is omitted, the universal joint 130 may include a trunnion, an outer ring, and a plurality of rollers. The trunnion rotates together with the input shaft 30 about the central axis C1. The outer ring rotates together with the output shaft 40 about the central axis C2. The rollers are arranged between the outer ring and the trunnion so that power is transmitted between the outer ring and the trunnion and that the outer ring can be tilted relative to the trunnion.

The members that constitute the universal joints 51, 51P, 51R, 52, 52P, 52R, 111, and 130 and the eccentric coupling 110 of the embodiments described above and that are involved in the transmission of the drive force are preferably formed of metals having high strength and rigidity, such as steel, aluminum alloys, or titanium alloys. The materials for the members that constitute the joints and coupling are not limited to metals. It is only necessary that the members be formed of materials having a Young's modulus that is larger than 1 GPa. The members may be formed of resins such as polypropylene, polystyrene, polycarbonate, or nylon, or may also be formed of silicon carbide or the like.

The present invention is not limited to the embodiments described above, and various modifications may be made within the scope of claims. For example, the steered wheels 3R and 3L may be steered wheels arranged on a rear side of the vehicle. The steering operation mechanisms 5R and 5L, the steering operation motors 4R and 4L, and the speed reducing mechanisms 6R and 6L may be provided for both of the steered wheels arranged on the front side of the vehicle and the steered wheels arranged on the rear side of the vehicle.

In each of the embodiments described above, one of the first speed reducer 80 and the second speed reducer 81 of the speed reducing mechanism 6R or 6L may be a strain wave gearing. In addition, various modifications may be made to the present invention within the scope of claims.

What is claimed is:

1. A vehicle steering system comprising:
   a laterally independent steering operation mechanism configured to steer a steered wheel; and
   an electric motor configured to apply a drive force to the laterally independent steering operation mechanism to steer the steered wheel, wherein:
   the laterally independent steering operation mechanism includes:
     an input shaft to which the drive force from the electric motor is input;
     an output shaft configured to output the drive force from the input shaft to the steered wheel, the output shaft being extendible and contractible in an axial direction of the output shaft, and the output shaft is rotatable about a central axis of the output shaft; and
     a coupling mechanism configured to couple the input shaft and the output shaft to each other, the output shaft having a first end coupled to a knuckle and a second end coupled to the coupling mechanism, the coupling mechanism including a universal joint that transmits the drive force from the input shaft to the output shaft in a state in which the output shaft is angularly offset from the input shaft,
   the output shaft constitutes a part of a suspension system,
   the steered wheel rotates about a kingpin axis when the steered wheel is steered, and
   when the steered wheel is steered, the output shaft pivots about a pivot center defined at an intersection of the kingpin axis and the central axis of the output shaft.

2. The vehicle steering system according to claim 1, wherein
   the universal joint of the coupling mechanism includes a first universal joint and a second universal joint, and
   the first universal joint and the second universal joint angularly offset the output shaft from the input shaft in two steps.

3. The vehicle steering system according to claim 2, wherein the coupling mechanism includes:
   a coupling shaft configured to couple the first universal joint and the second universal joint to each other; and
   a movement mechanism configured to move the output shaft relative to the coupling shaft in an axial direction of the coupling shaft.

4. The vehicle steering system according to claim 1, wherein the coupling mechanism includes an eccentric coupling configured to eccentrically offset the output shaft from the input shaft.

5. The vehicle steering system according to claim 1, wherein the coupling mechanism includes a movement mechanism configured to move the output shaft relative to the input shaft in an axial direction of the input shaft or the axial direction of the output shaft.

6. The vehicle steering system according to claim 1, further comprising a housing that houses the electric motor and is attached to a vehicle body in a movable manner, wherein
   the laterally independent steering operation mechanism includes a support member that is attached to the housing, the laterally independent steering operation mechanism being configured to support the universal joint so that the universal joint is rotatable about a central axis of the input shaft.

7. The vehicle steering system according to claim 6, wherein
   a portion of the support member that supports the universal joint and a portion of the universal joint that is supported by the support member constitute a bearing, and
   the coupling mechanism is provided with one universal joint and one support member as the universal joint and the support member, respectively, and a rotation center of the bearing and an angular offset center of the universal joint coincide with each other.

8. The vehicle steering system according to claim 1, further comprising a partition wall provided between the electric motor and the steered wheel.

9. The vehicle steering system according to claim 8, wherein at least a part of the electric motor is arranged side by side with the coupling mechanism in a direction orthogonal to an axial direction of the input shaft.

10. The vehicle steering system according to claim 8, wherein
    the electric motor includes a rotation shaft, and
    the rotation shaft extends in a direction intersecting the axial direction of the input shaft.

11. The vehicle steering system according to claim 1, wherein the output shaft is used for a MacPherson suspension system.

* * * * *